(12) United States Patent  (10) Patent No.: US 8,392,525 B2
Todoroki  (45) Date of Patent: Mar. 5, 2013

(54) MOBILE ELECTRONIC DEVICE, CONTENT PLAYBACK DEVICE, CONTENT ACQUISITION METHOD, CONTENT LOCATION NOTIFICATION METHOD, CONTENT ACQUISITION PROGRAM, AND CONTENT USE SYSTEM

(75) Inventor: Kaneo Todoroki, Kanagawa (JP)

(73) Assignee: Sony Mobile Communications AB, Lund (SE)

( * ) Notice: Subject to any disclaimer, the term of this patent is extended or adjusted under 35 U.S.C. 154(b) by 336 days.

(21) Appl. No.: 12/506,601

(22) Filed: Jul. 21, 2009

(65) Prior Publication Data

US 2010/0049825 A1  Feb. 25, 2010

(30) Foreign Application Priority Data

Aug. 22, 2008  (JP) ................................. 2008-213725

(51) Int. Cl.
*G06F 15/16* (2006.01)

(52) U.S. Cl. ......................................... 709/217; 705/59
(58) Field of Classification Search .................. 709/217; 725/61; 705/59
See application file for complete search history.

(56) References Cited

U.S. PATENT DOCUMENTS

| 7,236,960 | B2 * | 6/2007 | Manico et al. ................. | 705/500 |
| 7,890,599 | B2 * | 2/2011 | Kalmanje et al. ............. | 709/217 |
| 7,937,724 | B2 * | 5/2011 | Clark et al. ....................... | 725/35 |
| 7,995,756 | B1 * | 8/2011 | McKinney et al. ........... | 380/247 |
| 8,006,262 | B2 * | 8/2011 | Rodriguez et al. ............. | 725/37 |
| 2003/0193852 | A1 * | 10/2003 | Nakamichi ................. | 369/30.78 |
| 2004/0221299 | A1 | 11/2004 | Gibbs et al. | |
| 2005/0138192 | A1 | 6/2005 | Encarnacion et al. | |
| 2007/0180475 | A1 * | 8/2007 | Tsuchiya ........................ | 725/61 |
| 2007/0288470 | A1 | 12/2007 | Kauniskangas et al. | |
| 2008/0222044 | A1 * | 9/2008 | Gottlieb et al. ................. | 705/59 |
| 2008/0254899 | A1 * | 10/2008 | Weston et al. .................. | 463/47 |
| 2009/0063293 | A1 * | 3/2009 | Mirrashidi et al. ............. | 705/26 |

FOREIGN PATENT DOCUMENTS

| CN | 1385038 A | 12/2002 |
| CN | 1598778 A | 3/2005 |

(Continued)

OTHER PUBLICATIONS

"UFnP™ Device Architecture 1.0", UPnP™ Forum, URL:http://www.xml.coverpages.org/UPnP-DA101-20030506.doc, Version 1.0.1, XP003022763, May 6, 2003, 84 Pages.

(Continued)

*Primary Examiner* — Tesfay Yohannes
(74) *Attorney, Agent, or Firm* — Oblon, Spivak, McClelland, Maier & Neustadt, L.L.P.

(57) ABSTRACT

A mobile electronic device includes a communication unit connected to a network to which one or more content playback devices and one or more content holding devices are connected, a location query request sending unit that sends to the content playback devices on the network a location query request about content being played back by a content playback device connected to the network, a location query response receiving unit that receives a location query response about the content through the communication unit via the network in accordance with the location query request, a provision request sending unit that sends a provision request for providing the content through the communication unit to a content holding device that holds the content in accordance with the received location query response, and a content receiving unit that receives the content through the communication unit via the network in accordance with the provision request.

12 Claims, 18 Drawing Sheets

FOREIGN PATENT DOCUMENTS

| | | |
|---|---|---|
| CN | 1816053 | 8/2006 |
| CN | 101178712 A | 5/2008 |
| JP | 2006-301777 | 11/2006 |
| JP | 2007189418 A | 7/2007 |
| JP | 2008090755 A | 4/2008 |
| JP | 2008160581 A | 7/2008 |

OTHER PUBLICATIONS

"UFnP AV Architecture:1", for UPnP™ Version 1.0, Approved Design Document, URL:http://www.upnp.org, Document Version: 1.00, XP-002478718, Jun. 25, 2002, 22 Pages.

"Networked Digital Media Standards. A UPnP/DLNA Overview", Allegro Software Development Corporation, URL:http://www.allegrosoft.com/downloads/UPnP_DLNA_White_Paper.pdf, XP007906876, Oct. 26, 2006, 25 Pages.

Chinese Office Action issued on Jun. 22, 2011 in corresponding Chinese Application No. 200910163496.3 (with an English Translation).

Office Action issued Jan. 30, 2012 in China Application No. 200910163496.3 (With English Translation).

* cited by examiner

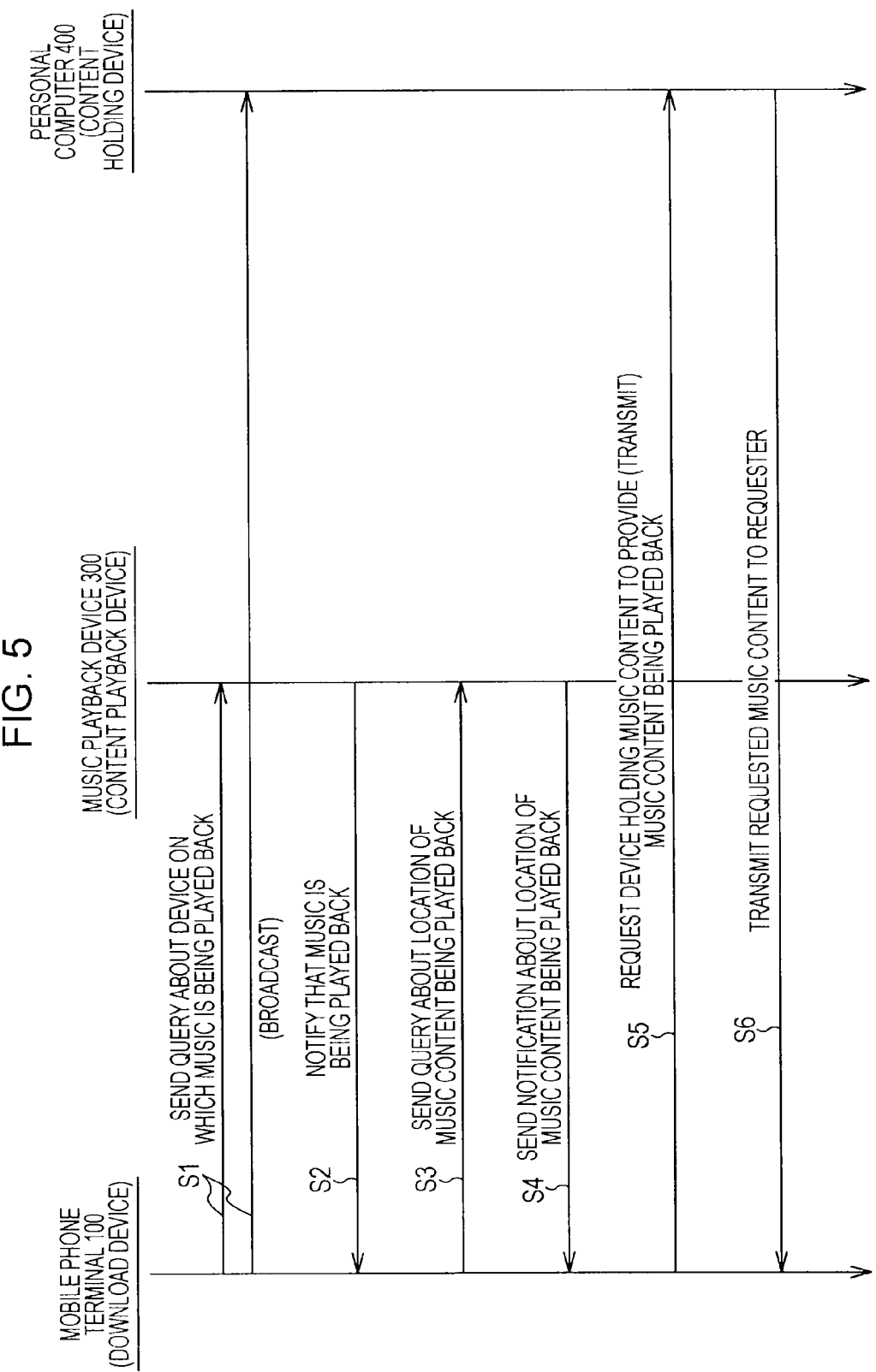

FIG. 6A

| SOURCE ID | DESTINATION ID | CONTENT |
|---|---|---|
| MOBILE PHONE TERMINAL (100) | ALL DEVICES CONNECTED | QUERY REQUEST ABOUT DEVICE ON WHICH MUSIC IS BEING PLAYED BACK |

FIG. 6B

| SOURCE ID | DESTINATION ID | CONTENT |
|---|---|---|
| MUSIC PLAYBACK DEVICE (300) | MOBILE PHONE TERMINAL (100) | NOTIFICATION ABOUT DEVICE ON WHICH MUSIC IS BEING PLAYED BACK (DEVICE QUERY RESPONSE) |

FIG. 6C

| SOURCE ID | DESTINATION ID | CONTENT |
|---|---|---|
| MOBILE PHONE TERMINAL (100) | MUSIC PLAYBACK DEVICE (300) | QUERY REQUEST ABOUT LOCATION OF MUSIC BEING PLAYED BACK |

FIG. 7A

| SOURCE ID | DESTINATION ID | MUSIC-CONTENT LOCATION INFORMATION | | | |
|---|---|---|---|---|---|
| | | DEVICE NAME | MAC ADDRESS | IP ADDRESS | DIRECTORY | FILE NAME |
| MUSIC PLAYBACK DEVICE (300) | MOBILE PHONE TERMINAL (100) | PERSONAL COMPUTER (400) | 00-3a-11-3d-09-62 | 168.192.0.2 | Music\Tracks\ | hit_song.mp3 |

FIG. 7B

| SOURCE ID | DESTINATION ID | CONTENT | DIRECTORY NAME | FILE NAME |
|---|---|---|---|---|
| MOBILE PHONE TERMINAL (100) | PERSONAL COMPUTER (400) | REQUEST FOR PROVISION OF MUSIC DATA | Music\Tracks\ | hit_song.mp3 |

FIG. 7C

| SOURCE ID | DESTINATION ID | CONTENT |
|---|---|---|
| PERSONAL COMPUTER (400) | MOBILE PHONE TERMINAL (100) | MUSIC DATA |

FIG. 14A

| SOURCE ID | DESTINATION ID | CONTENT |
|---|---|---|
| MOBILE PHONE TERMINAL (100) | PERSONAL COMPUTER (400) | REQUEST FOR PROVISION OF ALL SONGS ON ALBUM INCLUDING SONG BEING PLAYED BACK |

FIG. 14B

| SOURCE ID | DESTINATION ID | CONTENT |
|---|---|---|
| MOBILE PHONE TERMINAL (100) | PERSONAL COMPUTER (400) | REQUEST FOR PROVISION OF SONGS PROVIDED BY ARTIST OF SONG BEING PLAYED BACK |

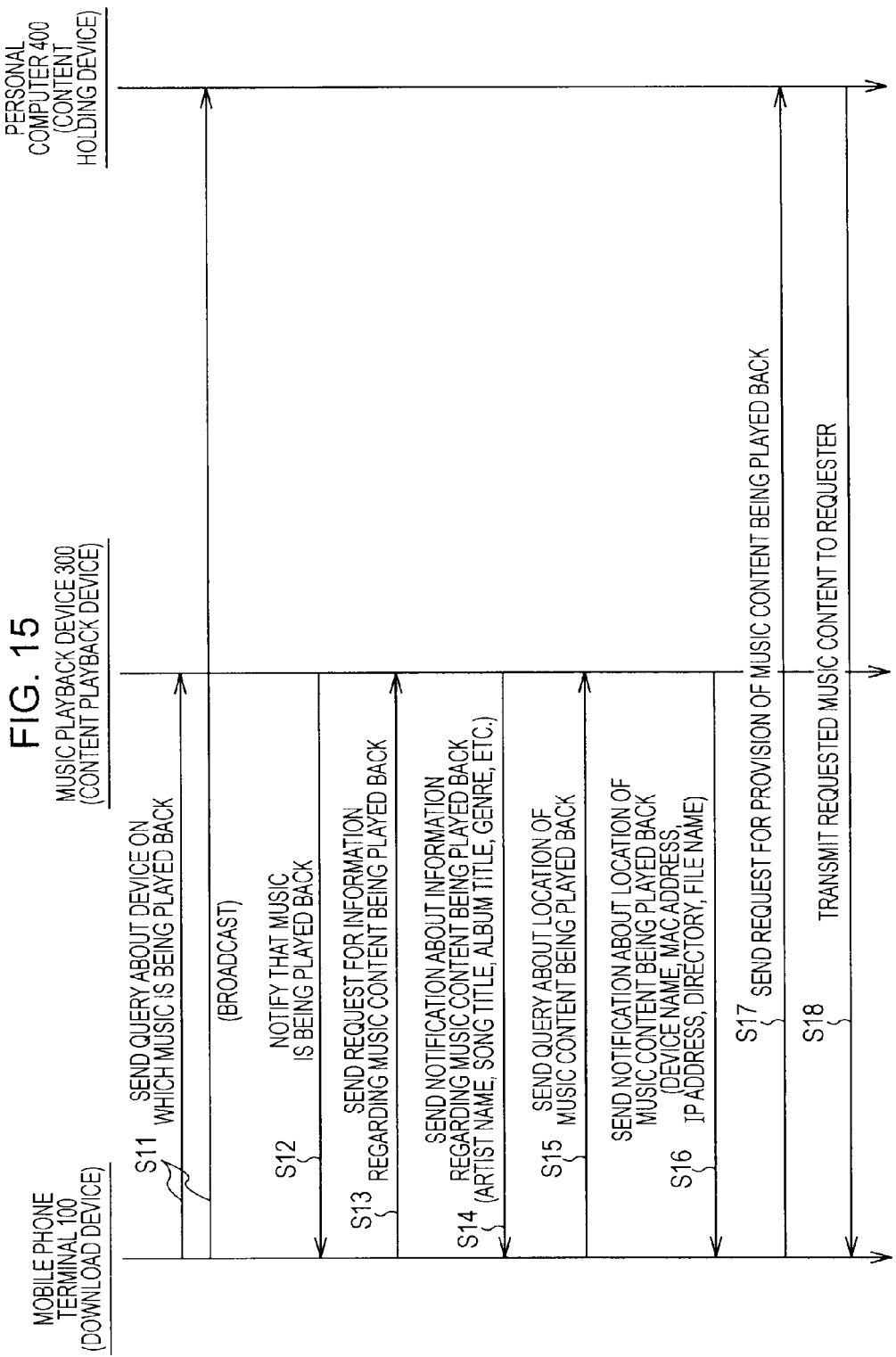

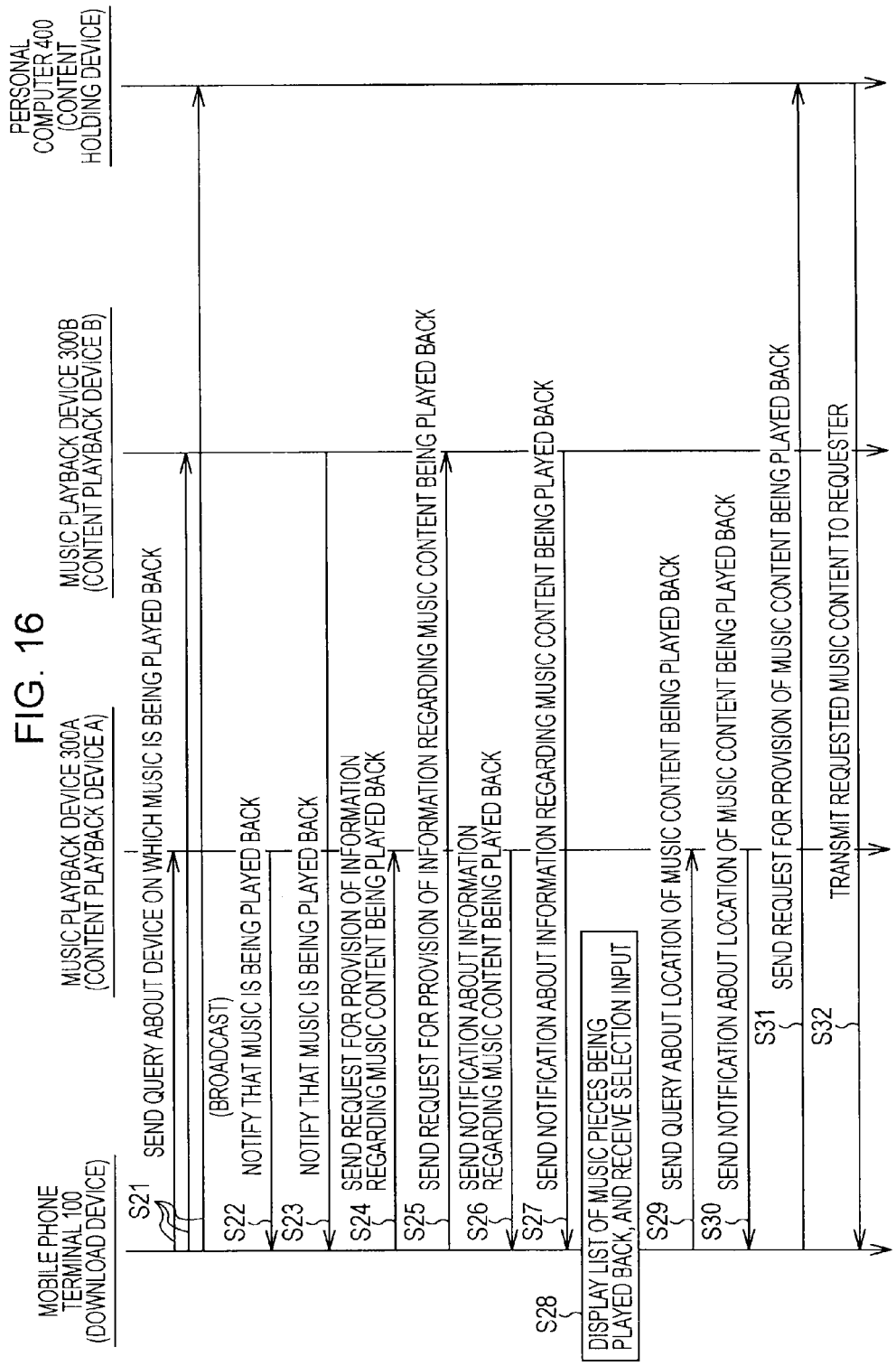

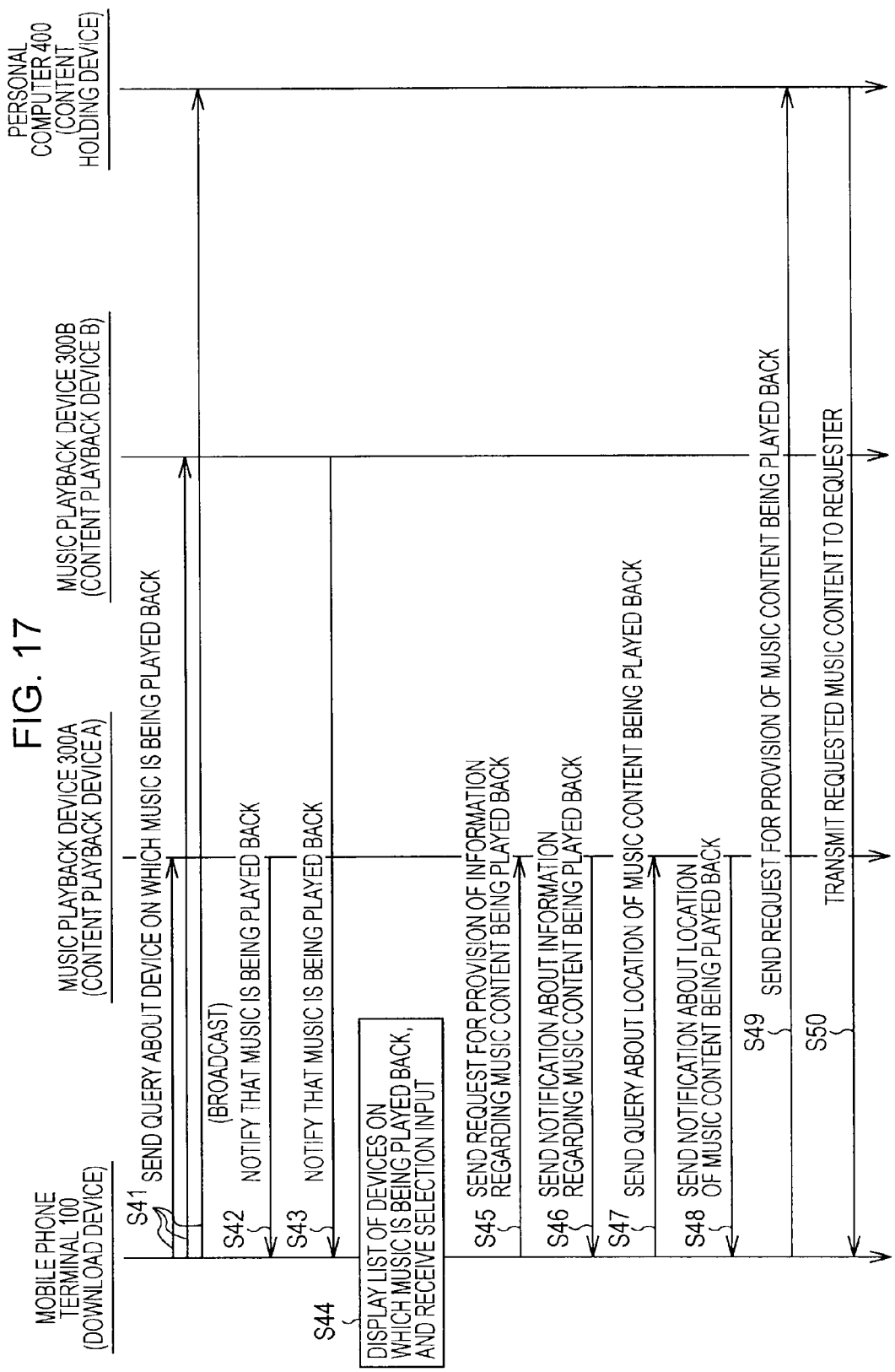

MOBILE ELECTRONIC DEVICE, CONTENT PLAYBACK DEVICE, CONTENT ACQUISITION METHOD, CONTENT LOCATION NOTIFICATION METHOD, CONTENT ACQUISITION PROGRAM, AND CONTENT USE SYSTEM

BACKGROUND OF THE INVENTION

1. Field of the Invention

The present invention relates to a device, method, program, and system for facilitating easy and efficient use of content via a predetermined network such as a local area network (LAN).

2. Description of the Related Art

Recently, the number of consumer electronic devices complying with guidelines or standards for providing network connection between different electronic devices in homes, such as the Digital Living Network Alliance (DLNA), has tended to significantly increase.

In use cases of network-connected electronic devices, for example, in DLNA, content and content attribute information are transmitted between two or three electronic devices. Thus, content existing in a certain electronic device, such as still image data, moving image data, and music data, can be transferred to another electronic device and can be played back or stored.

For example, Japanese Unexamined Patent Application Publication No. 2006-301777 discloses a technique for allowing continuous playback of same content from a certain device to another device with a simple user operation. The technique disclosed in Japanese Unexamined Patent Application Publication No. 2006-301777 will now be specifically described.

Content A is being played back on a hard disk drive (HDD) recorder. When the playback of the content A is interrupted, playback interruption information regarding the content A is sent to a mobile terminal and is held in the mobile terminal.

A user who is moving while carrying the mobile terminal uses the mobile terminal to request a network audio-visual (AV) player at the destination to play back the interrupted content A.

Then, the network AV player requests the HDD recorder to provide the content A so that the network AV player can play back the content A provided from the HDD recorder.

In the technique disclosed in Japanese Unexamined Patent Application Publication No. 2006-301777, therefore, the intervention of a mobile terminal allows easy and appropriate transfer of data between devices connected to a LAN, and also allows flexible use of content via the LAN.

SUMMARY OF THE INVENTION

In the technique disclosed in Japanese Unexamined Patent Application Publication No. 2006-301777, content can be easily transferred from an initial playback device to a target playback device at a destination with the intervention of a mobile terminal. However, as described above, due to the increase in the number of devices capable of connecting to networks such as a LAN, it is difficult to control these devices.

FIG. 18 is a diagram for illustrating an example configuration of a home network system for a DLNA-compliant consumer electronic device. As shown in FIG. 18, a personal computer 4 and a music playback device 3 are connected to a LAN 5, and a mobile phone terminal 1 is further connected to the LAN 5 via a wireless router 2.

In the home network system shown in FIG. 18, for example, an MP3 music file stored in the personal computer 4 is being played back on the music playback device (e.g., audio component system) 3 connected to the LAN 5. In this situation, there may be a case (use case) where a user 6 wishes to download this music file or song to the user's mobile phone terminal 1 and also listen to the song outdoor.

In order to implement this use case on a DLNA-compliant device, first, it is necessary for the user 6 to have in advance knowledge of which electronic device the music file being played back is stored in. In this example, without knowledge of whether the music file being played back is stored in the personal computer 4 or the music playback device 3, it is difficult to determine to which device a download request is to be sent.

Even if an electronic device in which the music file being played back is stored can be specified, it is also necessary for the user 6 to have in advance knowledge of the file name under which this music file is stored in this storage device. Without knowledge of the file name, it is difficult to send a request for downloading this music file.

However, if a large number of DLNA-compliant devices are present on a network or if the user 6 possesses a large number of items of content, there is an enormous number of possible combinations, and it is difficult for the user 6 to correctly recognize all the information. In the related art, due to this reason, it is difficult to satisfy such a use case.

It is therefore desirable to provide a network system in which even a user having no knowledge of the location or file name of content being played back can be provided with the content by using a simple operation.

According to an embodiment of the present invention, a mobile electronic device includes communication means, location query request sending means, location query response receiving means, provision request sending means, and content receiving means. The communication means performs communication by connecting to a network to which one or more content playback devices and one or more content holding devices are connected. The location query request sending means generates a location query request about content being played back by a content playback device connected to the network, and sends the location query request to the content playback devices on the network. The location query response receiving means receives a location query response about the content being played back through the communication means, the location query response being sent via the network in accordance with the location query request. The provision request sending means generates a provision request for providing the content being played back, and sends the provision request through the communication means to a content holding device that holds the content being played back in accordance with the received location query response. The content receiving means receives through the communication means content that is sent via the network in accordance with the provision request.

In the mobile electronic device, a location query request about content being played back by a content playback device on the network is generated by the location query request sending means, and is sent to content playback devices on the network through the communication means.

In response to the location query request from the mobile electronic device, a content playback device that is playing back content generates a location query response indicating the location of the content being played back and sends the location query response to the mobile electronic device. The location query response is received by the location query response receiving means through the communication means.

Based on the received location query response, it can be determined where the content being played back is held. Thus, the provision request sending means generates a content provision request for providing the content being played back, and sends the provision request to a content holding device that holds the content being played back through the communication means.

In response to the content provision request, the content holding device that holds the content being played back sends the content instructed to be provided to the requesting mobile electronic device. The content is received by the content receiving means so that the content can be used.

In this case, the received content can be recorded on a predetermined recording medium for use, or can be directly played back. Specifically, the content can be used by downloading and storing or holding the content or playing back the content via streaming.

Therefore, in a predetermined network, a user can specify the location of content being played back by a device connected to the network and can be provided with the content by using a simple operation even without knowledge of the location or file name of the content, so that the user can use the content.

The mobile electronic device may further include device query request sending means and device query response receiving means. The device query request sending means generates a device query request about a device that is playing back content, and sends the device query request to devices on the network through the communication means. The device query response receiving means receives through the communication means a device query response indicating a device that is playing back content, the device query response being sent via the network in accordance with the device query request. The location query request sending means may send the location query request to a content playback device that is playing back content, the content playback device being specified by the device query response received in the device query response receiving means.

In the mobile electronic device, a device query request about a device that is playing back content is generated by the device query request sending means, and is sent to devices on the network through the communication means.

Upon receiving the device query request, a content playback device that is playing back content generates and sends a device query response to the mobile electronic device. The device query response is received by the device query response receiving means through the communication means. Based on the received device query response, it can be recognized which content playback device on the network is playing back content. Then, the location query request sending means sends a location query request to the content playback device that is playing back content, which has been specified by the device query response.

Thus, a location query request about content being played back can be appropriately sent to a content playback device that is playing back content, resulting in reliable and efficient querying of the location of the content and specification of the location of the content. Therefore, in a predetermined network, a user can specify the location of content being played back by a device connected to the network and can be provided with the content by using a simple operation even without knowledge of the location or file name of the content, so that the user can use the content.

The mobile electronic device may further include device query request sending means, device query response receiving means, display control means, and selection input receiving means. The device query request sending means generates a device query request about a device that is playing back content, and sends the device query request to devices on the network through the communication means. The device query response receiving means receives through the communication means a device query response indicating a device that is performing playback, the device query response being sent via the network in accordance with the device query request. When the device query response is received from each of a plurality of content playback devices through the device query response receiving means, based on the device query responses, the display control means displays a playback device selection screen for selecting a content playback device on display means. The selection input receiving means receives a selection input of a desired content playback device on the playback device selection screen. The location query request sending means may send the location query request to a content playback device specified by the device query response from the content playback device selected through the selection input receiving means.

In the mobile electronic device, a device query request which is an inquiry about a device that is playing back content is generated by the device query request sending means, and is sent to devices on the network through the communication means.

Upon receiving the device query request, a content playback device that is playing back content generates a device query response indicating that the content playback device is a device that is playing back content, and sends the device query response to the mobile electronic device. The device query response is received by the device query response receiving means through the communication means.

In a case where a plurality of content playback devices connected to the network are playing back content, a device query response is sent from each of the plurality of content playback devices. In this case, based on the received device query responses, a playback device selection screen for selecting a content playback device is displayed on the display means by the display control means. Then, a selection input of a content playback device desired by a user is received through the selection input receiving means.

Then, the location query request sending means sends a location query request to the content playback device that is playing back content, which is specified by the user's selection input received through the selection input receiving means.

Thus, even if a plurality of content playback devices that are playing back content exist, a location query request about content desired by a user can be appropriately sent to a content playback device that is playing back the content. Therefore, in a predetermined network, a user can specify the location of content being played back on a device connected to the network can be provided with the content by using a simple operation even without knowledge of the location or file name of the content, and so that the user can use the content.

According to an embodiment of the present invention, therefore, in a case where various electronic devices are connected to a predetermined network so that various types of content can be transmitted, a user can be provided with content being played back by using a simple operation even without knowledge of the location or file name of the content, and can use the content.

BRIEF DESCRIPTION OF THE DRAWINGS

FIG. 5 is a sequence diagram for illustrating operations between devices, in a case where music content provided from the personal computer is being played back by the music playback device, for allowing the mobile phone terminal to download the music content;

FIGS. 6A to 6C are diagrams for illustrating an example layout of a request and response sent and received between devices in the home network system according to the first embodiment;

FIGS. 7A to 7C are diagrams for illustrating an example layout of a request and response sent and received between devices in the home network system according to the first embodiment;

FIGS. 14A and 14B are diagrams showing an example layout of download requests sent from the mobile phone terminal to the personal computer in the process shown in FIG. 12;

FIG. 15 is a sequence diagram for illustrating a process in a second modification of the first embodiment;

FIG. 16 is a sequence diagram for illustrating a process in a home network system according to a second embodiment of the present invention;

FIG. 17 is a sequence diagram for illustrating a process in a modification of the second embodiment.

DESCRIPTION OF THE PREFERRED EMBODIMENTS

Embodiments of the present invention will be described hereinafter with reference to the drawings.

First Embodiment

Overview of Home Network System according to First Embodiment

Figure 1:
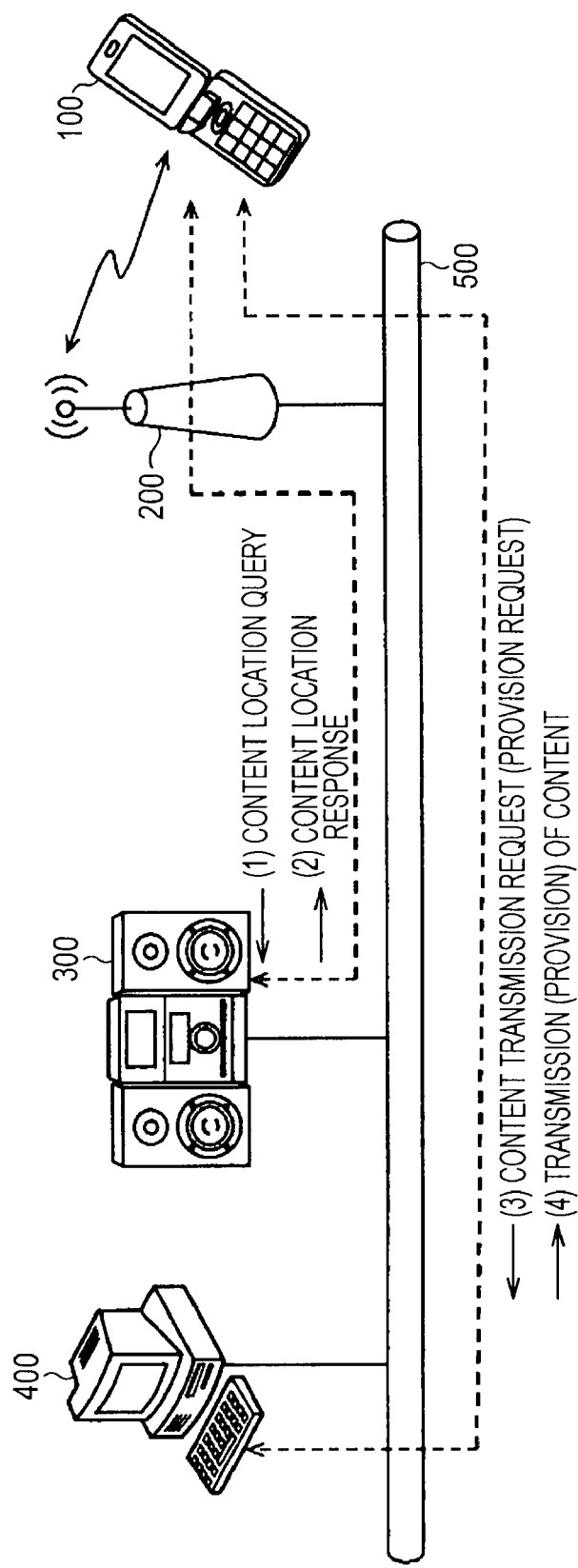
FIG. 1 is a diagram for illustrating an overview of a home network system (content use system) according to a first embodiment of the present invention.

FIG. 1 is a diagram for illustrating an overview of a home network system (content use system) according to a first embodiment of the present invention. As shown in FIG. 1, the home network system according to the first embodiment is configured such that a mobile phone terminal 100, a music playback device 300, and a personal computer 400 are connected to one another via a LAN 500.

As also described below, the mobile phone terminal 100, which has a function for connecting to a LAN in a wireless manner, is configured to be connected to the LAN 500 via a wireless router 200 so that music content or the like can be downloaded via the LAN 500. That is, the mobile phone terminal 100 may function as a download device.

Note that the mobile phone terminal 100 can also perform other operations such as playing back music content provided via the LAN 500 or sending music content held in a recording medium incorporated in the mobile phone terminal 100 via the LAN 500.

As also described below, the music playback device 300, which has a function for connecting to a LAN, is configured to receive and play back music content (audio data) provided via the LAN 500. That is, the music playback device 300 may function as a content playback device for playing back content provided via the LAN 500.

The music playback device 300 includes a drive (media drive) for a recording medium such as a compact disc (CD) or a Mini Disc (registered trademark) (MD). The music playback device 300 can also play back music content recorded on a recording medium placed therein or send the music content via the LAN 500.

As also described below, the personal computer 400 includes a hard disk drive having a large-capacity hard disk, and has a function for connecting to a LAN. The personal computer 400 can provide a large number of items of music content held in the hard disk to the music playback device 300 or the like via the LAN 500. That is, the personal computer 400 may function as a content holding device.

The personal computer 400 can also play back music content held in a hard disk incorporated therein or can be provided with music content via the LAN 500.

In this manner, each of the devices constituting the home network system according to the first embodiment can mutually send and receive music content via the LAN 500, and the music content can be used on the device in a different manner.

Each of the devices connected to the home network system according to the first embodiment supports functions complying with the DLNA guideline. The DLNA guideline is a guideline for the specification of communication schemes or data transmission schemes and data formats, which is provided by an organization that takes actions to implement mutual connection between electronic devices.

Further, in the home network system shown in FIG. 1 according to the first embodiment, as also described above, the mobile phone terminal 100 is connected to the LAN 500 via the wireless router 200 according to a wireless communication scheme (wireless scheme). The wireless router 200, the music playback device 300, and the personal computer 400 are connected to the LAN 500 via a wired communication such as Ethernet (registered trademark).

In the first embodiment with the configuration described above, it is assumed that music content being played back by the music playback device 300 that has received the music content provided from the personal computer 400 via the LAN 500 is downloaded to the mobile phone terminal 100.

As also described above, in the home network system according to the first embodiment, the mobile phone terminal 100 may be used as a download device. Further, the music playback device 300 may be used as a content playback device. Also, the personal computer 400 may be used as a content holding device.

In this case, the user of the mobile phone terminal 100 operates the mobile phone terminal 100 to send, as indicated by (1) in FIG. 1, a content location query (an inquiry as to where the content is located) to the music playback device 300 that is playing back the content via the LAN 500.

It is natural for the user to operate the mobile phone terminal 100 to first send a query to the music playback device 300. This is because, at this time, the only device that the user can recognize has information regarding the content being played back is the music playback device 300 that is playing back the music content.

As indicated by (2) in FIG. 1, the music playback device 300 that is playing back the music content returns a content location response about the music content being played back (a response as to where the content is located) to the mobile phone terminal 100 that is the sender of the content location query. Thus, the mobile phone terminal 100 recognizes the location of the music content being played back.

As a result of the query about the location of the music content, for example, it is found that the personal computer 400 holds the music content being played back. In this case, as indicated by (3) in FIG. 1, the user operates the mobile phone terminal 100 to send a content transmission (provision) request about the content being played back to the personal computer 400.

Thus, as indicated by (4) in FIG. 1, the music content being played back is transmitted (provided) from the personal computer 400 to the mobile phone terminal 100. Accordingly, the music content can be downloaded to the mobile phone terminal 100.

If it is found as a result of the content location query about the music content that the music playback device 300 holds the music content being played back, the user operates the mobile phone terminal 100 to send a request for transmitting (providing) the content being played back to the music playback device 300. Thus, also, the music content being played back can be downloaded from the music playback device 300.

In the home network system according to the first embodiment, therefore, it is not necessary for the user of the mobile phone terminal 100 to recognize in advance the location of music content and attribute information regarding music content being played back (such as the file name of the music content).

The home network system according to the first embodiment implements a new use case where the user of the mobile phone terminal 100 can download music content, which the user is now listening to, to the user's mobile phone terminal 100 by using a simple operation.

In addition, the home network system according to the first embodiment also implements, as an application, a new function that allows a user to, when certain music content is being played back on a DLNA-compatible device, download all songs on an album including this music content.

Additionally, the home network system according to the first embodiment further implements a new function that allows a user to, when certain music content is being played back on a DLNA-compatible device, also download other songs provided by the artist who performs this music content.

Therefore, not only the downloading of music content being played back but also the downloading of music content in various forms can be achieved.

Example Configuration of Mobile Phone Terminal 100

Figure 2:
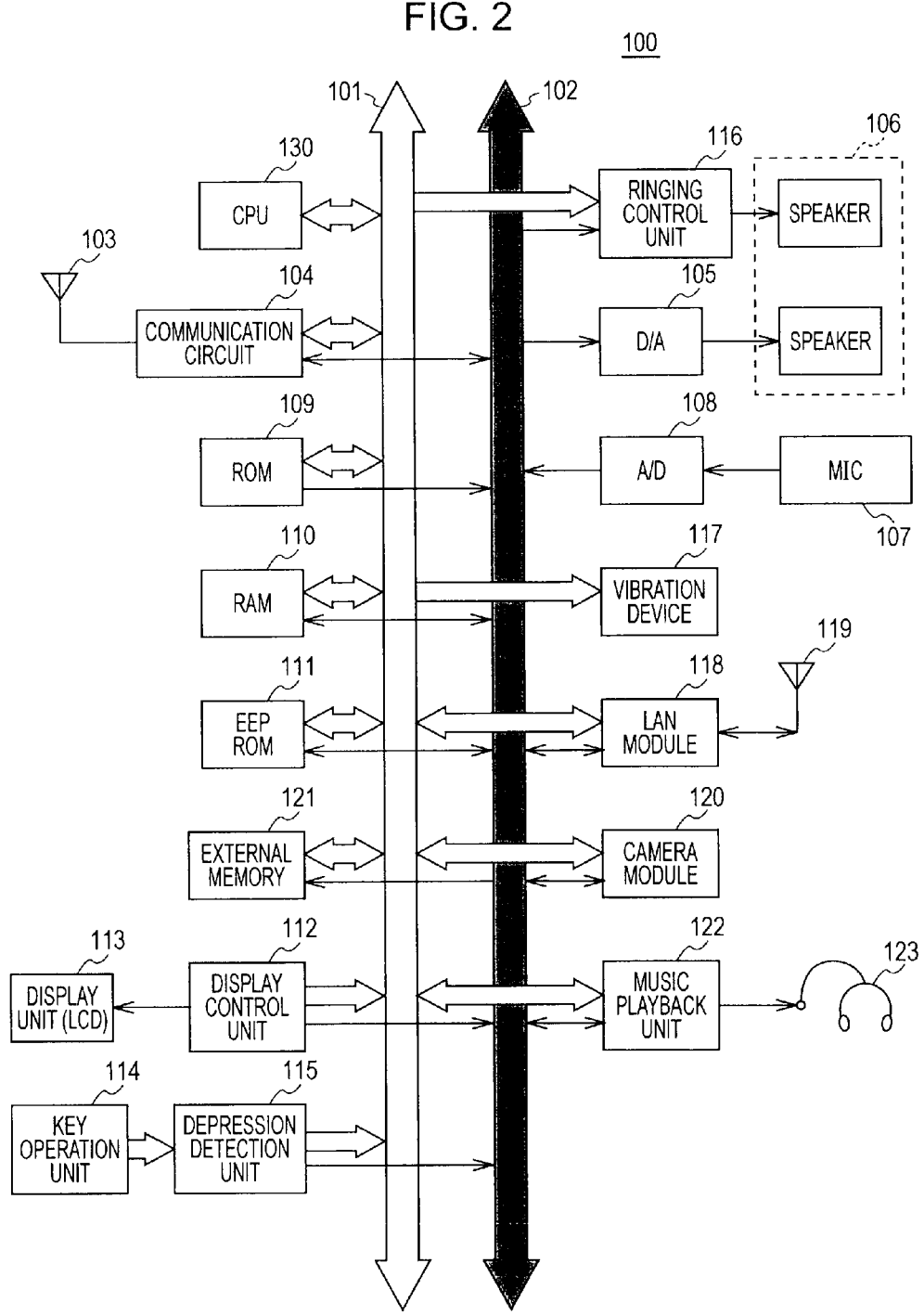
FIG. 2 is a block diagram for illustrating an example configuration of a mobile phone terminal which may be implemented by a mobile electronic device according to an embodiment of the present invention.

Next, an example configuration of the mobile phone terminal 100 connected to the home network system according to the first embodiment will be described. FIG. 2 is a block diagram for illustrating an example configuration of the mobile phone terminal 100 which may be implemented by a mobile electronic device according to an embodiment of the present invention.

As shown in FIG. 2, the mobile phone terminal 100 according to this embodiment has a control line (control bus) 101 and a data line (data bus) 102. The control line 101 is used for the transmission of a control signal, and the data line 102 is used for the transmission of various data.

As shown in FIG. 2, a central processing unit (CPU) 130, a communication circuit 104, a read only memory (ROM) 109, and a random access memory (RAM) 110 are connected to the control line 101.

Also, an electrically erasable and programmable ROM (EEPROM) 111, a display control unit 112, a depression detection unit 115, a ringing control unit 116, a vibration device 117, and a LAN module 118 are further connected to the control line 101.

Also, a camera module 120, an external memory 121, and a music playback unit 122 are further connected to the control line 101.

As shown in FIG. 2, the communication circuit 104, the ROM 109, the RAM 110, the EEPROM 111, the display control unit 112, the depression detection unit 115, a digital-to-analog (D/A) converter 105, an analog-to-digital (A/D) converter 108, and the ringing control unit 116 are connected to the data line 102.

Also, the LAN module 118, the camera module 120, the external memory 121, and the music playback unit 122 are further connected to the data line 102.

As shown in FIG. 2, the communication circuit 104 is connected to a transmitting/receiving antenna 103. The display control unit 112 is connected to a liquid crystal display (LCD) 113 serving as a display unit (hereinafter also referred to as the display unit 113). The depression detection unit 115 is connected to a key operation unit 114. The LAN module 118 is connected to a LAN transmitting/receiving antenna 119.

A speaker 106 that may also be used as an earpiece is further connected to the D/A converter 105 and the ringing control unit 116. A microphone (in FIG. 1, represented by "MIC") 107 that may also be used as a mouthpiece is connected to the A/D converter 108.

In the foregoing description, the speaker 106 is connected to the ringing control unit 116 and the D/A converter 105. However, the embodiment of the present invention is not limited thereto. Each of the ringing control unit 116 and the D/A converter 105 can also have an individual speaker.

For example, the mobile phone terminal 100 uses a rechargeable battery pack (not shown) as a power source. A power supply circuit for supplying drive power to each circuit unit when the power source of the mobile phone terminal 100 is turned on is also provided.

In the mobile phone terminal 100, the CPU 130, the ROM 109, the RAM 110, and the EEPROM 111 may constitute a microcomputer. The microcomputer may function as a control unit for controlling each unit of the mobile phone terminal 100.

Basic Operation of Mobile Phone Terminal 100

Next, the basic operation of the mobile phone terminal 100 having the configuration shown in FIG. 2 will be described. First, a process involved when receiving a call at the mobile phone terminal 100, that is, a process for responding to an incoming call, will be described.

An incoming call notification signal that has arrived is received and tuned by the transmitting/receiving antenna 103 and the communication circuit 104. The signal tuned by the communication circuit 104 is demodulated by the communication circuit 104, and the demodulated signal is sent to the CPU 130 via the control line 101.

If the received and tuned signal is an incoming call notification signal whose destination is the mobile phone terminal 100, the CPU 130 reads ringtone data prepared in advance in, for example, the ROM 109, and supplies the read ringtone data to the ringing control unit 116. The ringtone data may be used to generate ringtones such as ringing melodies.

The ringing control unit 116 generates a ringtone of an analog signal from the ringtone data supplied thereto, and supplies the ringtone to the speaker 106. Thus, the ringtone is output from the speaker 106 so that the user of the mobile phone terminal 100 can be notified of an incoming call.

Similarly, upon detecting an incoming call notification signal whose destination is the mobile phone terminal 100, the CPU 130 controls the vibration device 117 to vibrate so that the user of the mobile phone terminal 100 can be notified of an incoming call.

The incoming call notification through ringtone and the incoming call notification through vibration can be used at the same time, or one of them can be used.

When the user of the mobile phone terminal 100 perceives arrival of an incoming call through ringtone or vibration, the user operates a call start key (off-hook key) on the key operation unit 114.

When the call start key is operated, this operation is detected by the depression detection unit 115, and the CPU 130 is notified via the control line 101.

Upon receipt of a notification of depression of the call start key from the depression detection unit 115, the CPU 130 controls the communication circuit 104 to perform a process for connecting to a predetermined communication line, such as sending a response signal. Thus, a connection line is established between the communication terminal originating the call and the mobile phone terminal 100 so that a telephone call can be made therebetween.

Specifically, a signal from the other party originating the call is received and tuned using the transmitting/receiving antenna 103 and the communication circuit 104. The received and tuned signal sent from the other partner is subjected to processing such as demodulation into a baseband signal using the communication circuit 104. The baseband signal is supplied to the D/A converter 105 via the data line 102.

The D/A converter 105 converts the supplied baseband signal into an analog signal, and supplies the analog signal to the speaker 106. Thus, a voice corresponding to the signal sent from the other party is output from the speaker 106.

The voice of the user of the mobile phone terminal 100 is picked up by the microphone 107, and is supplied to the A/D converter 108 as an analog electrical signal. The A/D converter 108 converts the supplied analog audio signal into a digital signal, and supplies the digital signal to the communication circuit 104 via the data line 102.

The communication circuit 104 generates a transmission signal including the digital signal supplied thereto, and sends the transmission signal through the transmitting/receiving antenna 103. Thus, the user voice is sent to the other party of the communication. In this manner, in response to an incoming call to the mobile phone terminal 100, a communication line is established between the mobile phone terminal 100 and the other party originating the call so that a telephone call can be made therebetween.

When a user places a call using the mobile phone terminal 100, the user enters a destination telephone number of the other party by, for example, pressing number keys on the key operation unit 114 of the mobile phone terminal 100.

Then, the depression of the number keys is detected by the depression detection unit 115, and the CPU 130 is notified via the control line 101. The CPU 130 temporarily stores the depression of the number keys in, for example, the RAM 110. Upon detecting the depression of the call start key, the CPU 130 generates a dialing signal including the received telephone number, and sends the dialing signal through the communication circuit 104 and the transmitting/receiving antenna 103.

The dialing signal is sent to the telephone terminal of the other party at the destination through telephone company facilities such as a base station and a switchboard. When the other party performs a response operation in response to the dialing signal, a response signal is sent from the other party.

Upon receiving the response signal, under control of the CPU 130, the communication circuit 104 confirms that a communication line has been established with the other party at the destination. Then, similarly to the case where a telephone call is made in response to an incoming call to the mobile phone terminal 100 described above, a telephone call is made through the transmitting/receiving antenna 103, the communication circuit 104, the D/A converter 105, the speaker 106, the microphone 107, and the A/D converter 108.

When a call is placed, a telephone call can also be initiating by selecting the telephone number of a desired party from telephone directory data, which may be registered in advance in a mobile phone terminal, and pressing the call start key.

Also, when a call arrives, the telephone number of the party originating the call can be displayed or the current time can be displayed. Further, during the registration in or selection on the telephone directory data described above, a telephone number or a name or company name corresponding to the telephone number can be displayed, or various guidance messages, warning messages, or the like can also be displayed.

The display control unit 112 and the LCD 113 can be used for this purpose. In accordance with control of the CPU 130, the display control unit 112 displays various information on the LCD 113. The LCD 113 has a relatively large display screen so that various displayed information can be provided to the user with high visibility.

In this way, the mobile phone terminal 100 can respond to an incoming call or can place a call to a desired party.

The mobile phone terminal 100 is further configured to access the Internet using, for example, the function provided by the telephone company to access a desired homepage to search for information, download necessary information, or send and receive electronic mail.

When connecting to the Internet using the mobile phone terminal 100, the user operates a predetermined Internet connection key on the key operation unit 114. This operation is detected by the depression detection unit 115, and a request for connecting to the Internet is sent from the depression detection unit 115 to the CPU 130 via the control line 101.

In response to the request, the CPU 130 controls the communication circuit 104 via the control line 101 so that a request for connecting to the Internet is generated in the communication circuit 104 and is sent through the transmitting/receiving antenna 103. Upon receiving the request for connecting to the Internet, the telephone company's system connects the requesting mobile phone terminal 100, to the Internet in accordance with the request.

Thus, the mobile phone terminal 100 can be connected to the Internet, and can access a desired server to send and receive packet data so that processes such as sending a request for providing necessary information and receiving the information provided in response to the request can be performed.

The mobile phone terminal 100 can also create electronic mail for transmission inside a transmission folder in the EEPROM 111. In this case, the user can enter characters through the key operation unit 114 and the depression detection unit 115, and can create electronic mail for transmission while checking entered characters displayed on the display unit 113 through the display control unit 112.

The electronic mail for transmission, which has been generated inside the transmission folder in the EEPROM 111 in the manner described above, is detected by the depression detection unit 115 by operating the key operation unit 114 to perform the operation for sending the electronic mail, and the CPU 130 is notified via the control line 101. The CPU 130 controls the communication circuit 104 to send the electronic mail created inside the transmission folder in the EEPROM 111 to the mail server of the designated party.

When electronic mail that has arrived is accumulated in the mail server of the mobile phone terminal 100, the key operation unit 114 is operated to perform the operation for instructing reception of the electronic mail that has arrived. Then, the operation is detected by the depression detection unit 115, and the CPU 130 is notified via the control line 101.

In this case, the CPU 130 controls the communication circuit 104 to access the mail server of the mobile phone terminal 100 to download the electronic mail that has arrived, and stores the electronic mail in a reception folder in the EEPROM 111.

The electronic mail that has arrived and has been stored in the reception folder in the EEPROM 111 in the manner described above is read under control of the CPU 130, and is supplied to the display control unit 112 via the data line 102.

Accordingly, the electronic mail sent to the mobile phone terminal 100 is supplied to the LCD 113 through the display control unit 112 and is displayed on the display screen of the LCD 113. In this way, electronic mail sent to the mobile phone terminal 100 from another party is obtained and displayed on the LCD 113 so that the user can read the electronic mail.

The mobile phone terminal 100 is therefore capable of, in addition to merely performing telephone communication, due to the function for connecting to the Internet, performing other processes via the Internet, such as obtaining information or sending and receiving electronic mail. That is, the mobile phone terminal 100 is capable of performing, as broadband communication functions, Internet-based data communication as well as telephone communication.

As also described above, the mobile phone terminal 100 is further provided with the LAN module 118. Upon receipt of a predetermined operation input through the key operation unit 114, the CPU 130 controls the LAN module 118.

Then, the mobile phone terminal 100 is connected to the LAN 500 through the wireless router 200 to send a query about the location of music content to a music playback device that is playing back the music content. In accordance with a location response received, the mobile phone terminal 100 can perform processes such as downloading the music content being played back.

The music content downloaded in this way is recorded on the external memory 121 through the LAN module 118 and the data line 102. Alternatively, the music content is supplied to the music playback unit 122 from the LAN module 118 via the data line 102 and is played back via streaming.

The music content recorded on the external memory 121 is read under control of the CPU 130 upon receipt of a playback instruction through the key operation unit 114, and is supplied to the music playback unit 122 via the data line 102. Accordingly, the music content can be played back.

As shown in FIG. 2, for example, a headphone 123 or the like is connected to the music playback unit 122. The user can listen to playback sound using the headphone 123.

The mobile phone terminal 100 is also provided with the camera module 120 so that an image of a subject can be photographed and captured as digital image data, and can be stored in the EEPROM 111 or the external memory 121.

The image data captured and stored in the EEPROM 111 or the external memory 121 is read as necessary and is supplied to the LCD 113 through the display control unit 112. Thus, the image data can be used by, for example, displaying an image corresponding to the image data on the display screen of the LCD 113.

The mobile phone terminal 100 is also provided with a universal serial bus (USB) interface (I/F) (not shown) so that various external devices having a USB I/F can be connected to the mobile phone terminal 100. For example, a USB memory can be connected to the mobile phone terminal 100 so that digital image data stored in the EEPROM 111 can be backed up in the USB memory. Alternatively, the mobile phone terminal 100 can be connected to a personal computer through the USB I/F so that data can be backed up in a hard disk in the personal computer or various data provided from the personal computer can be received.

The mobile phone terminal 100 is further provided with a clock circuit (not shown) so that the current year, month, and day, the current day of week, and the current time can be provided. The mobile phone terminal 100 is also capable of measuring various time intervals such as processing time under control of the CPU 130.

Therefore, the mobile phone terminal 100 can connect to a telephone network to perform telephone communication, or can connect to the Internet to perform various types of communication. In addition, the mobile phone terminal 100 can also connect to the LAN 500 through the LAN module 118 to send and receive various data.

Example Configuration of Music Playback Device 300

Figure 3:
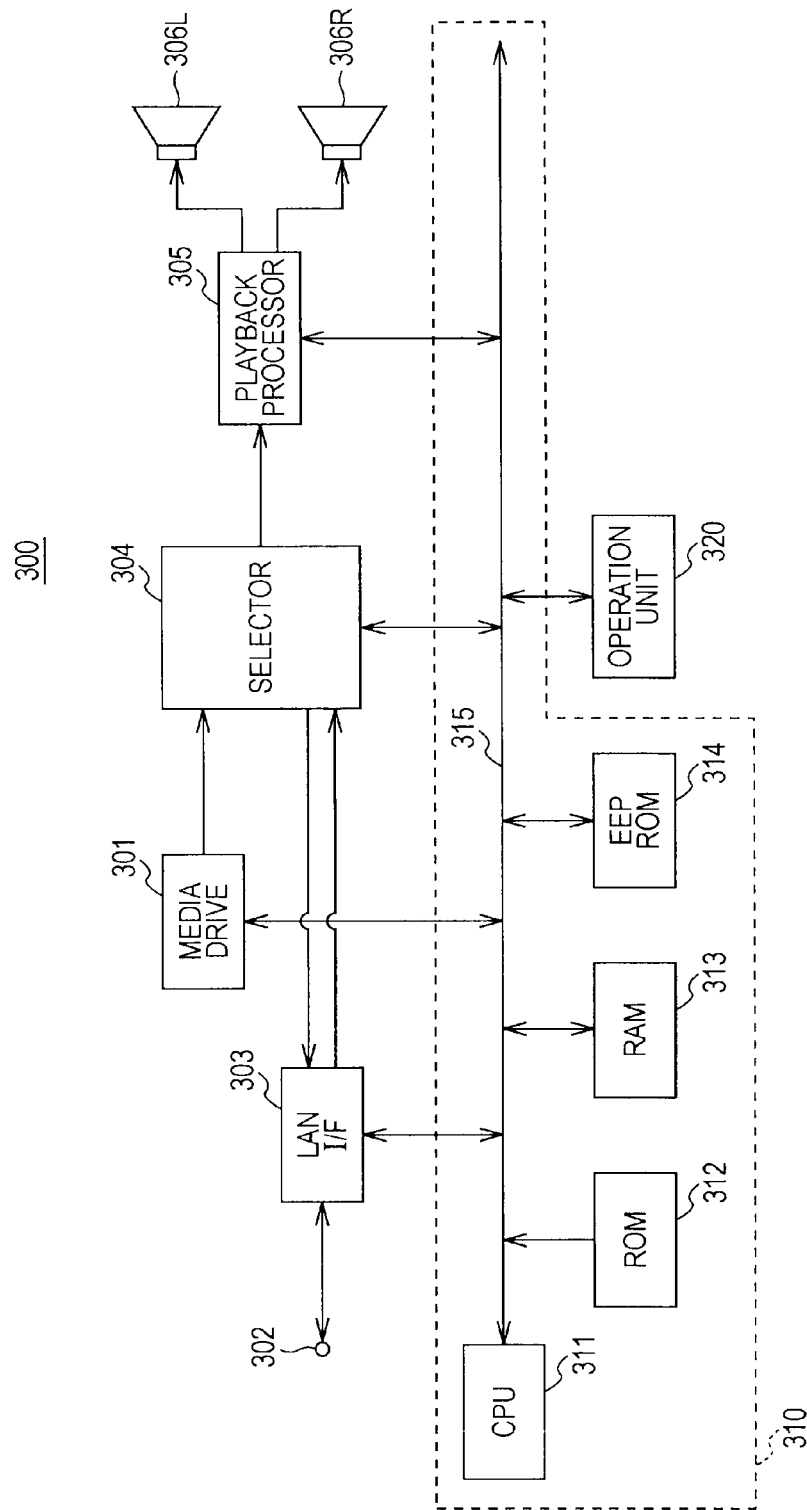
FIG. 3 is a block diagram for illustrating an example configuration of a music playback device which may be implemented by a content playback device according to an embodiment of the present invention.

Next, an example configuration of the music playback device 300 connected to the home network system according to the first embodiment will be described. FIG. 3 is a block diagram for illustrating an example configuration of the music playback device 300 which may be implemented by a content playback device according to an embodiment of the present invention.

As shown in FIG. 3, the music playback device 300 according to this embodiment is configured such that a media drive 301 is connected to a selector 304. A LAN connection terminal 302 is also connected to the selector 304 through a LAN interface (hereinafter abbreviated as "LAN I/F") 303.

The selector 304 is connected to a playback processor 305. The playback processor 305 is connected to two-channel left and right speakers 306L and 306R.

Further, as shown in FIG. 3, a control unit 310 is connected to each unit of the music playback device 300. The control unit 310 is configured to control each unit of the music playback device 300, and may be a microcomputer constituted by connecting, as shown in FIG. 3, a CPU 311, a ROM 312, a RAM 313, and an EEPROM 314 to one another via a CPU bus 315.

The CPU 311 is configured to execute a program stored and held in the ROM 312, as also described below, to generate a control signal to be supplied to each unit and supply the control signal to each unit or process data supplied from each unit.

As described above, the ROM 312 is configured such that various programs to be executed by the CPU 311 or various data necessary for processes is recorded. The RAM 313 may be used mainly as a work area such as being used to temporarily store intermediate results in various processes.

The EEPROM 314 is a non-volatile memory, and stores and holds data to be held even after the power of the music playback device 300 is turned off, for example, various setting parameters, a new program provided for enhanced functions, and other various data.

The control unit 310 is also connected to an operation unit 320. The operation unit 320 includes various operation keys such as a selector switch, a playback start key, a pause key, a playback stop key, a fast forward key, and a fast rewind key, and other various function keys and dial keys.

The operation unit 320 is configured to, upon receipt of various operation inputs from a user, convert each of them into an electrical signal and send the electrical signal to the control unit 310. Thus, the control unit 310 controls each unit in accordance with the user's operation inputs so that the music playback device 300 can perform processes according to the user's instructions.

In this embodiment, the media drive 301 of the music playback device 300 may have a port in which a removable recording medium such as a CD or an MD can be placed.

Under control of the control unit 310, the media drive 301 drives the recording medium placed therein to rotate, and reads and outputs desired music content.

The LAN connection terminal 302 serves as a part that forms a contact end to the LAN 500. The LAN I/F 303 receives data whose destination is the music playback device 300, which has been supplied through the LAN connection terminal 302, and separates the data into control data and music content. The control data is supplied to the control unit 310, and the music content is supplied to the selector 304.

Further, upon receipt of music data provided from the media drive 301, which has been supplied through the selector 304, the LAN I/F 303 can also convert the music data into music data of the format that can be delivered to the LAN 500 and deliver the resulting music to the LAN 500.

The selector 304 is configured to switch between the source and destination of the music data in accordance with control of the control unit 310. Specifically, the selector 304 selects which music data from the media drive 301 or the LAN I/F 303 is to be supplied to the playback processor 305.

The selector 304 is also configured to perform switching so that the music data supplied from the media drive 301 can be delivered to the LAN 500 through the LAN I/F 303 and the LAN connection terminal 302.

The playback processor 305 is provided after the selector 304. When music content supplied to the playback processor 305 is compressed content, the playback processor 305 decompresses the music content, converts resulting content into an analog signal, amplifies the signal, and supplies a resulting signal to the speakers 306L and 306R.

Thus, a sound corresponding to the audio content supplied from the media drive 301 or the audio content supplied from the LAN I/F 303 is output from the speakers 306L and 306R. The user can listen to the sound.

Basic Operation of Music Playback Device 300

Next, the basic operation of the music playback device 300 having the configuration shown in FIG. 3 will be described. First, a case where music content recorded on a recording medium placed in the media drive 301 is played back using the operation unit 320 will be described.

In this case, the control unit 310 controls the media drive 301 to read music content instructed to be played back from a recording medium placed in the media drive 301, and supplies the music content to the selector 304.

The selector 304 is switched under control of the control unit 310 so as to supply the music content from the media drive 301 to the playback processor 305. Accordingly, the music content supplied from the media drive 301 is supplied to the playback processor 305 through the selector 304.

The playback processor 305 generates an analog audio signal to be supplied to the speakers 306L and 306R on the basis of the music content supplied to the playback processor 305, and supplies the analog audio signal to the speakers 306L and 306R.

Therefore, a sound corresponding to the music content read from the recording medium set in the media drive 301 is output from the speakers 306L and 306R.

Then, a case where music content provided via the LAN 500 is played back using the operation unit 320 will be described.

In this case, the control unit 310 controls the LAN I/F 303 to separate data whose destination is the music playback device 300, which has been received through the LAN connection terminal 302, into control data and music content. The control data is supplied to the control unit 310, and the music content is supplied to the selector 304.

The selector 304 is switched under control of the control unit 310 so as to supply the music content from the LAN I/F 303 to the playback processor 305. Accordingly, the music content supplied from the LAN I/F 303 whose destination is the music playback device 300 is supplied to the playback processor 305 through the selector 304.

The playback processor 305 generates an analog audio signal to be supplied to the speakers 306L and 306R on the basis of the music content supplied to the playback processor 305, and supplies the analog audio signal to the speakers 306L and 306R.

Therefore, a sound corresponding to the music content supplied to the music playback device 300 through the LAN 500 is output from the speakers 306L and 306R.

Then, a case where music content recorded on a recording medium placed in the media drive 301 is delivered to the LAN 500 using the operation unit 320 will be described.

In this case, the control unit 310 controls the media drive 301 to read music content instructed to be delivered from a recording medium placed in the media drive 301, and supplies the music content to the selector 304.

The control unit 310 switches the selector 304 so as to supply the music content from the media drive 301 to the LAN I/F 303. Accordingly, the music content supplied from the media drive 301 is supplied to the LAN I/F 303 through the selector 304.

The LAN I/F 303 adds data indicating the destination, data indicating the source, and the like to the music content supplied from the selector 304 to produce transmission music content, and delivers the transmission music content to the LAN 500 connected through the LAN connection terminal 302.

Therefore, the music content on the recording medium placed in the media drive 301 is sent to a device specified by the user among the devices connected to LAN 500.

Further, in the music playback device 300 according to the present embodiment, when a request whose destination is the music playback device 300, which has been transmitted via the LAN 500, is received through the LAN connection terminal 302 and the LAN I/F 303, this request is supplied to the control unit 310.

The control unit 310 analyzes the request received from the LAN I/F 303 to generate a response to the request, and delivers the response to the LAN 500 through the LAN I/F 303 and the LAN connection terminal 302 so that a response to the request can also be sent to the requesting device.

Therefore, the music playback device 300 is capable of, in addition to playing back music content recorded on a recording medium placed therein, performing other processes such as playing back, via streaming, music content provided via the LAN 500 and responding to a request sent via the LAN 500.

Example Configuration of Personal Computer 400

Figure 4:
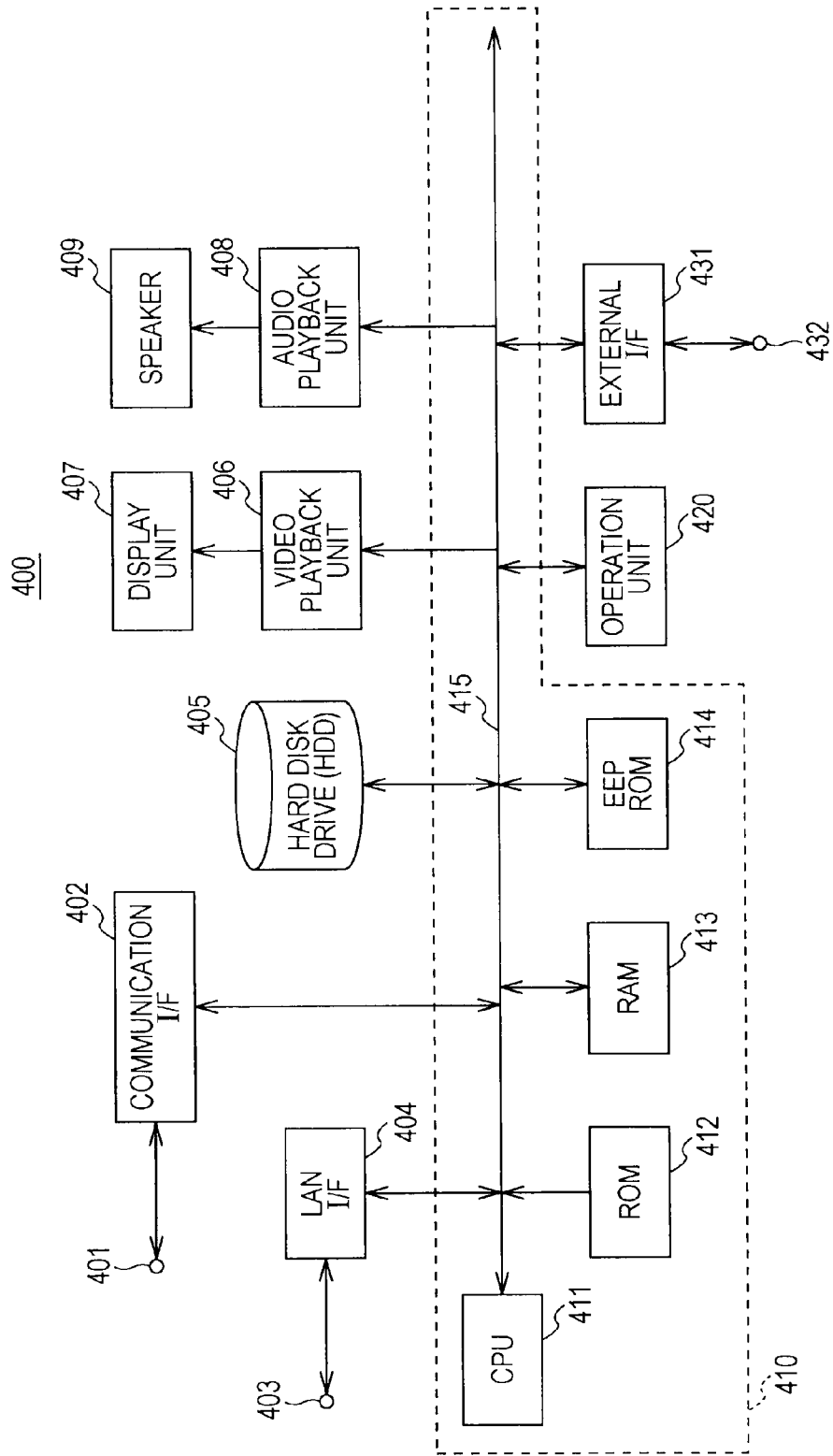
FIG. 4 is a block diagram for illustrating an example configuration of a personal computer connected to the home network system according to the first embodiment.

Next, an example configuration of the personal computer 400 connected to the home network system according to the first embodiment will be described. FIG. 4 is a block diagram for illustrating an example configuration of the personal computer 400 connected to the home network system according to the first embodiment.

As shown in FIG. 4, the personal computer 400 according to the present embodiment includes, as data input and output terminals, a connection terminal 401 for connecting to a communication line, and a LAN connection terminal 403. The connection terminal 401 for connecting to a communication line is connected to a communication interface used for broadband communication (hereinafter referred to as a "communication I/F") 402, and the LAN connection terminal 403 is connected to a LAN interface (hereinafter referred to as a "LAN I/F") 404.

The connection terminal 401, the communication I/F 402, the LAN connection terminal 403, and the LAN I/F 404 constitute a data input and output system.

The personal computer 400 further includes a hard disk drive (hereinafter abbreviated as "HDD") 405 having a large-capacity hard disk.

The personal computer 400 further includes an information playback system including a video playback unit 406, a display unit 407, an audio playback unit 408, and a speaker 409. The display unit 407 includes a display element such as an LCD, a plasma display panel (PDP), or a cathode-ray tube (CRT) display.

As shown in FIG. 4, a control unit 410 is connected to each unit of the personal computer 400. The control unit 410 is configured to control each unit of the personal computer 400, and may be a microcomputer constituted by connecting a CPU 411, a ROM 412, a RAM 413, and an EEPROM 414 to one another via a CPU bus 415.

The CPU 411 is configured to execute a program stored in the ROM 412, as also described below, to generate a control signal to be supplied to each unit and supply the control signal to each unit or process data supplied from each unit.

As described above, the ROM 412 is configured such that various programs to be executed by the CPU 411 or various data necessary for processes is recorded. The RAM 413 may be used mainly as a work area such as being used to temporarily store intermediate results in various processes.

The EEPROM 414 is a non-volatile memory, and stores data to be held even after the power of the personal computer 400 is turned off, for example, various setting parameters, a new program provided for enhanced functions, and other various data.

The control unit 410 is also connected to an operation unit 420. The operation unit 420 may be a keyboard having number keys, alphabet keys, and various function keys, a pointing device such as a mouse, or the like.

The operation unit 420 is configured to, upon receipt of various operation inputs from a user, convert each of them into an electrical signal and send the electrical signal to the control unit 410. Thus, the control unit 410 controls each unit in accordance with the user's operation inputs so that the personal computer 400 can perform processes according to the user's instructions.

An external interface (hereinafter referred to as an "external I/F") 431 is further connected to the control unit 410. The external I/F 431 is connected to an input/output terminal 432. Various external devices such as a digital camera and a music recording and playback device can be connected to the input/output terminal 432.

Therefore, the personal computer 400 can send and receive various data from and to an external device connected to the input/output terminal 432 through the external I/F 431.

Basic Operation of Personal Computer 400

Next, the basic operation of the personal computer 400 having the configuration shown in FIG. 4 will be described. The personal computer 400 may be similar to a normal personal computer.

That is, the personal computer 400 can access the Internet through the connection terminal 401 for connecting to a communication line and the communication I/F 402, and can send and receive electronic mail. The personal computer 400 can also access a desired Web page to browse necessary information or can download the information and store the information in the hard disk in the HDD 405.

Further, upon receipt of various data provided from various devices connected to the LAN 500 through the LAN connection terminal 403 and the LAN I/F 404, the personal computer 400 can record the received data onto the hard disk in the HDD 405 through the control unit 410. Moreover, the personal computer 400 can also send various content stored and held in the hard disk in the HDD 405 to a target electronic device through the LAN I/F 404 and the LAN connection terminal 403.

Similarly, the personal computer 400 can send and receive various data to and from an external device connected to the input/output terminal 432 through the external I/F 431. Specifically, data held in the personal computer 400 can be provided to the external device through the external I/F 431 and the input/output terminal 432, or data received through the input/output terminal 432 and the external I/F 431 can be recorded onto the hard disk in the HDD 405.

Also, according to various application programs such as a word processor program and a spreadsheet program executed in the control unit 410, data input through the operation unit 420 can be processed and recorded onto the hard disk in the HDD 405.

During the input of data, input information can be displayed on a display screen of the display unit 407 through the control unit 410 and the video playback unit 406 so that the user can carry out the process while viewing the display screen. In other words, during the execution of various processes, the user can confirm the progress of the processes which is displayed on the display screen of the display unit 407 through the video playback unit 406.

Further, music content recorded on the hard disk in the HDD 405 is read through the control unit 410 and supplied to the audio playback unit 408 to generate an audio signal for playback, and this audio signal is supplied to the speaker 409. Accordingly, the music content can be played back.

The personal computer 400 is therefore capable of, upon being provided with various data, processing the data and recording the processed data onto the hard disk in the HDD 405, or capable of processing data held in the hard disk in the HDD 405 and outputting the processed data.

The personal computer 400 connected to the home network system according to the first embodiment stores and holds a large number of items of music content in the hard disk in the HDD 405.

Upon receiving a request for providing music content through the LAN connection terminal 403 and the LAN I/F 404, the control unit 410 reads the requested music content from the HDD 405, and provides the music content to the requester through the LAN I/F 404.

In the first embodiment, therefore, the personal computer 400 also functions as a content holding device for holding music content and providing the music content in accordance with a request.

Operation of Home Network System

An operation for allowing the mobile phone terminal 100 to download music content being played back by the music playback device 300 that has received the music content provided from the personal computer 400 via the LAN 500 will now be described. FIG. 5 is a sequence diagram for illustrating operations between devices in the above case.

Here, it is assumed that music content provided from the personal computer 400 via the LAN 500 is being played back by the music playback device 300. Then, the music content being played back by the music playback device 300 is downloaded to the mobile phone terminal 100 so that the user can also listen to the music content, even when away from home or in other places, using the mobile phone terminal 100.

In this case, the user of the mobile phone terminal 100 performs a predetermined operation on the key operation unit 114 of the mobile phone terminal 100 to start a process for downloading the content being played back.

In accordance with this operation input, the CPU 130 of the mobile phone terminal 100 generates a device query request (playback-device query request) for the query (inquiry) and confirmation of a device that is playing back music, and sends the device query request to all devices connected to the LAN 500 (step S1).

The device query request is generated by the CPU 130, and is delivered to the LAN 500 through the LAN module 118, the LAN transmitting/receiving antenna 119, and the wireless router 200. Then, the device query request is sent to individual devices (the music playback device 300 and the personal computer 400) on the LAN 500.

In the home network system according to the first embodiment, the music playback device 300 is playing back music content provided from the personal computer 400. Thus, the control unit 310 of the music playback device 300 generates a device query response indicating that the music playback device 300 is a device that is playing back music content, and sends the device query response to the requesting mobile phone terminal 100 through the LAN I/F 303 and the LAN connection terminal 302 (step S2).

The device query response is sent to the mobile phone terminal 100 via the LAN 500 and the wireless router 200, and is received by the mobile phone terminal 100. Thus, the mobile phone terminal 100 can recognize that the music playback device 300 is the content playback device that is playing back the music content.

In this manner, based on a playback device response from the music playback device 300 in response to a device query request from the mobile phone terminal 100, the mobile phone terminal 100 can recognize that the music playback device 300 is a device that is playing back music content.

In other words, based on a device query response from the device that is playing back music, the mobile phone terminal 100 can recognize, without user's setting or the like, that the music playback device 300 is a device that is playing back music content.

Then, the mobile phone terminal 100 generates a location query request about the music content being played back, and sends the location query request to the device that is playing back the music content, namely, the music playback device 300 (step S3). Specifically, the location query request is delivered to the LAN 500 through the LAN module 118 and LAN transmitting/receiving antenna 119 of the mobile phone terminal 100 and the wireless router 200, and is sent to the music playback device 300.

Upon receiving a music-content location query request whose destination is the music playback device 300 through the LAN connection terminal 302 and the LAN I/F 303, the music playback device 300 notifies the control unit 310 of the receipt of the request. The music playback device 300 has been in effect provided with the music content being played back, and the control unit 310 has knowledge of where the music content being played back is located (the location of the music content).

Specifically, the control unit 310 of the music playback device 300 has knowledge of content information such as the title, artist name, and genre of the music content being played back. The control unit 310 also has knowledge of within which device, in which folder, and under which file name the music content being played back is stored.

Thus, upon receiving the location query request, the control unit 310 of the music playback device 300 generates a location query response about the music content being played back, and sends the location query response to the requesting mobile phone terminal 100 through the LAN I/F 303 and the LAN connection terminal 302 (step S4).

The location query response generated here may be information that can represent at least within which device, in which folder, and under which file name the music content being played back is stored.

The location query response is sent to the mobile phone terminal 100 via the LAN 500 and the wireless router 200, and is received by the mobile phone terminal 100. In the first embodiment, as also described above, the music playback device 300 is playing back music content provided from the personal computer 400.

Thus, based on the location query response from the music playback device 300, the mobile phone terminal 100 can recognize that the music content being played back is held in the personal computer 400 and can also recognize the folder name and the file name under which the music content being played back is stored.

The CPU 130 of the mobile phone terminal 100 generates, based on the location query response, a provision request for requesting the personal computer 400 to provide the music content being played back by the music playback device 300, and sends the provision request to the personal computer 400 (step S5).

In step S5, the provision request generated by the CPU 130 of the mobile phone terminal 100 is sent to the personal computer 400 connected to the LAN 500 through the LAN module 118 and the LAN transmitting/receiving antenna 119.

Upon receiving a music-content provision request whose destination is the personal computer 400 through the LAN connection terminal 403 and the LAN I/F 404, the personal computer 400 notifies the control unit 310 of the receipt of the request. In accordance with the received provision request, the control unit 410 of the personal computer 400 reads the specified music content from the hard disk in the HDD 405, and sends the music content to the requesting mobile phone terminal 100 (step S6).

The music content read from the hard disk in the HDD 405 by the control unit 410 is converted into data of a transmission format. Then, the resulting data is delivered to the LAN 500 through the LAN I/F 404 and the LAN connection terminal 403, and is sent to the mobile phone terminal 100.

This allows the mobile phone terminal 100 to download the music content being played back by the music playback device 300 from the personal computer 400 that holds the music content.

In this case, it is not necessary for the user of the mobile phone terminal 100 to recognize on which device the music content being played back is being played back, or recognize which device actually holds the music content being played back. The mobile phone terminal 100 performs communication with devices connected to the LAN 500, thereby quickly and accurately recognizing the location of the music content being played back. Thus, desired music content can be downloaded.

Example Layout of Request and Response Sent and Received Between Devices

FIGS. 6A to 6C and 7A to 7C are diagrams for illustrating an example layout of a request and response sent and received between devices in the home network system according to the first embodiment described with reference to FIG. 5.

FIG. 6A shows an example layout of a device query request sent to each device connected to the LAN 500 from the mobile phone terminal 100 in step S1 shown in FIG. 5. As shown in FIG. 6A, in the first embodiment, the device query request includes a source ID which is set to the device ID of the mobile phone terminal 100, and a destination ID which is set to information indicating that the request is sent to all the connected devices.

As shown in FIG. 6A, the device query request further includes, as content of the notification sent from the transmission destination to the transmission source, information indicating a device query request about the device that is playing back music. Using this device query request, the requester queries whether or not each device on the LAN 500 is a music content playback device.

FIG. 6B shows an example layout of a device query response sent from the music playback device 300 that is playing back music to the mobile phone terminal 100 that is the source of the device query request in step S2 shown in FIG. 5. As shown in FIG. 6B, in the first embodiment, the device query response includes a source ID which is set to the device ID of the music playback device 300, and a destination ID which is set to the device ID of the mobile phone terminal 100.

As shown in FIG. 6B, the device query response further includes, as content of the notification sent from the transmission destination to the transmission source, information (device query response) indicating that the transmission source device, namely, the music playback device 300, is a device that is playing back music. Using this device query response, the device that is playing back the music content informs the requesting device of the device where playback is in progress.

FIG. 6C shows an example layout of a location query request about music content being played back, which is sent from the mobile phone terminal 100 to the music playback device 300 that is playing back music in step S3 shown in FIG. 5. As shown in FIG. 6C, in the first embodiment, the location query request includes a source ID which is set to the device ID of the mobile phone terminal 100, and a destination ID which is set to the device ID of the music playback device 300 that is playing back music.

As shown in FIG. 6C, the location query request further includes, as content of the notification sent from the transmission destination to the transmission source, information indicating a query about the location of the music content being played back. Using this location query request, the requester inquires the music playback device 300 that is playing back the music content about the location of the music content being played back.

FIG. 7A shows an example layout of a location query response sent from the music playback device 300 that is playing back music to the mobile phone terminal 100 that is the source of the query request about the location of the music content being played back in step S4 shown in FIG. 5. As shown in FIG. 7A, in the first embodiment, the location query response includes a source ID which is set to the device ID of the music playback device 300, and a destination ID which is set to the device ID of the mobile phone terminal 100.

As shown in FIG. 7A, the location query response further includes, as music-content location information, information regarding the device that holds the music content, such as device name, Media Access Control (MAC) address, Internet Protocol (IP) address, directory name (folder name), and file name. This location query response allows the mobile phone terminal 100 to recognize where the music content being played back is located.

The MAC address is used for identifying a device connected to a LAN. The IP address is information corresponding to the address of a computer connected to the Internet. The above two pieces of information allow each of devices connected to the LAN 500 to be identified.

FIG. 7B shows an example layout of the music-content provision request sent from the mobile phone terminal 100 to the personal computer 400 that holds the music content being played back in step S5 shown in FIG. 5. As shown in FIG. 7B, in the first embodiment, this data includes a source ID which is set to the device ID of the mobile phone terminal 100, and a destination ID which is set to the device ID of the personal computer 400.

As shown in FIG. 7B, the music-content provision request further includes, as content of the notification sent from the transmission destination to the transmission source, information indicating a request for providing music content. The music-content provision request further includes a directory name and file name as information indicating the location where the music content is stored. The information (directory name and file name) provided by the location query response received in step S4 is set as the information indicating the location. This music-content provision request can be used to request provision of the music content being played back.

FIG. 7C shows an example layout of the music content sent from the personal computer 400 that holds the music content being played back to the requesting mobile phone terminal 100 in step S6 shown in FIG. 5. As shown in FIG. 7C, in the first embodiment, this data includes a source ID which is set to the device ID of the personal computer 400, and a destination ID which is set to the device ID of the mobile phone terminal 100.

As shown in FIG. 7C, this data is transmitted in such a manner that the data further stores, as main data (content), music content (audio data) according to the request. Thus, the music content being played back by the music playback device 300 can be provided from the personal computer 400 that holds this music content to the mobile phone terminal 100 so that the music content can be used on the mobile phone terminal 100.

Since the data amount of music content is large, music content is generally divided into packets each having a predetermined data amount and is then transmitted. The packets are sequentially sent according to the format shown in FIG. 7C. In this case, the last packet is added with information indicating that this packet is the last.

In this manner, in the steps shown in FIG. 5, by sending and receiving the requests and responses shown in FIGS. 6A to 6C and 7A to 7C, the mobile phone terminal 100 can have accurate knowledge of the device that is playing back music content and the location of the music content being played back.

Therefore, the user of the mobile phone terminal 100 can download the music content being played back to the mobile phone terminal 100 even without knowledge of which device is playing back the music content or where this content is located.

Operation of Mobile Phone Terminal 100

Figure 8:
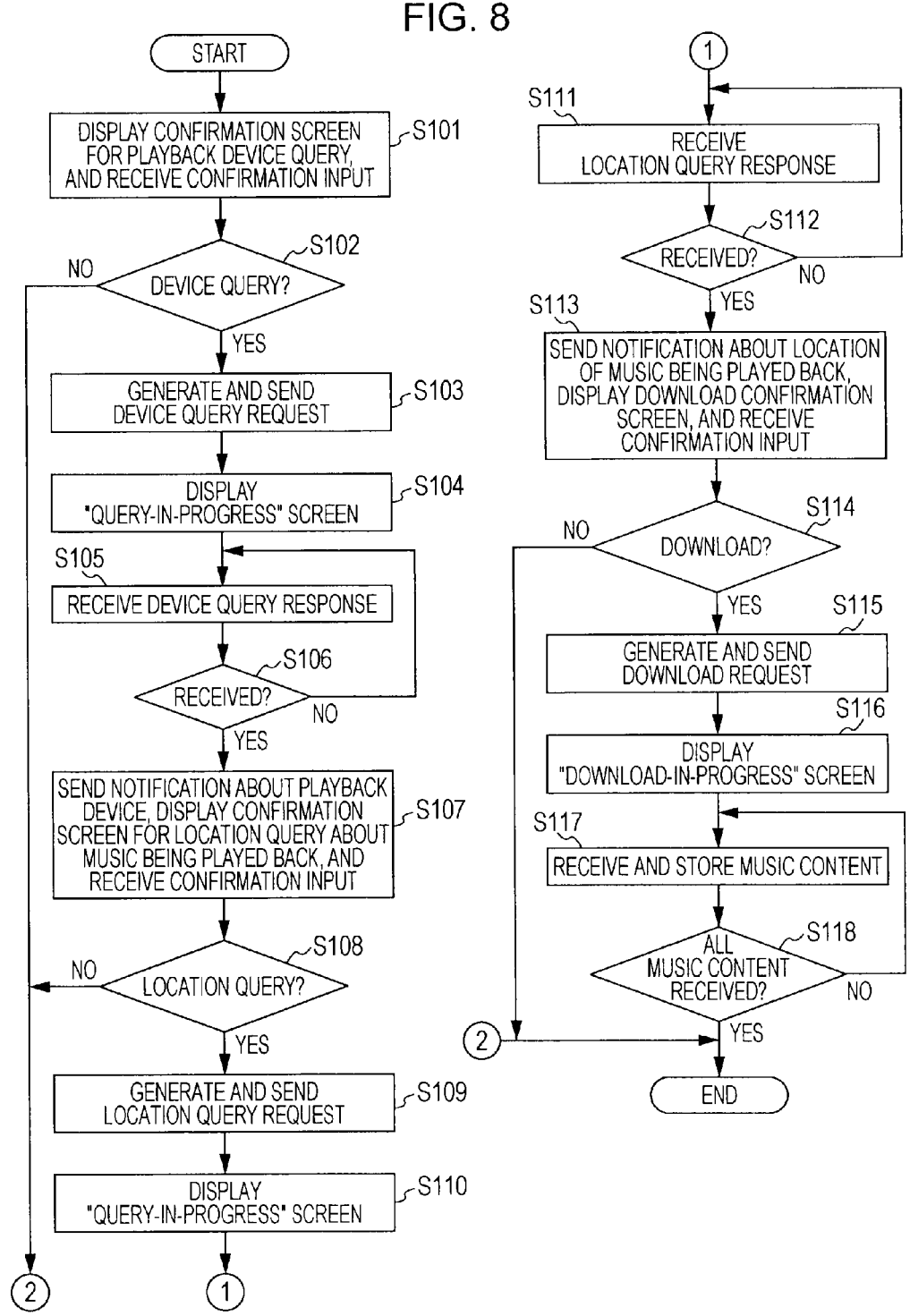
FIG. 8 is a flowchart for illustrating the operation of the mobile phone terminal.

Next, the operation of the mobile phone terminal 100 in the home network system according to the first embodiment will be described in detail. FIG. 8 is a flowchart for illustrating the operation of the mobile phone terminal 100.

The process shown in FIG. 8 is a process executed mainly by the CPU 130 of the mobile phone terminal 100. This process is executed by the user of the mobile phone terminal 100 performing a predetermined operation on the key operation unit 114 of the mobile phone terminal 100 to start a process for downloading content being played back by a device on the LAN 500.

Specifically, a menu key of the key operation unit 114 is pressed, thereby displaying a list menu of processes available on the mobile phone terminal 100. A process for downloading music being played back is selected from the list menu to thereby execute the process.

First, the CPU 130 reads necessary information from the ROM 109 to produce a confirmation screen for a playback device query. The confirmation screen is displayed on the display unit 113 by the display control unit 112, and a confirmation input as to whether or not to make a playback device query is received through the key operation unit 114 (step S101).

In step S101, the CPU 130 determines whether or not an instruction for making a playback device query has been given (step S102). If it is determined in step S102 that there is no instruction for making a playback device query, the process shown in FIG. 8 ends.

If it is determined in step S102 that an instruction for making a playback device query has been given, the CPU 130 generates a device query request, and sends the device query request to the LAN 500 through the LAN module 118 and the LAN transmitting/receiving antenna 119 (step S103).

The device query request sent to the LAN 500 in step S103 may have the layout described with reference to FIG. 6A.

Upon sending the device query request, the CPU 130 produces a screen display indicating that the query is in progress, and displays the screen display on the display screen of the display unit 113 through the display control unit 112 (step S104).

Then, the CPU 130 receives a device query response through the LAN transmitting/receiving antenna 119 and the LAN module 118 (step S105), and determines whether or not a device query response has been received (step S106). The device query response received in step S105 may have the layout described with reference to FIG. 6B.

If it is determined in step S106 that no device query response has yet been received, the processing after step S105 is repeated. If it is determined in step S106 that a device query response has been received, the following process is performed (step S107).

In step S107, the CPU 130 produces a confirmation screen for a location query about music content being played back, and displays the confirmation screen on the display unit 113 through the display control unit 112. A confirmation input as to whether or not to make a location query is received through the key operation unit 114.

Specifically, in step S107, the following two sub-processes (a process for producing a confirmation screen and a process for displaying the confirmation screen and receiving a confirmation input) are performed.

First, the CPU 130 gives a notification about a playback device on the basis of the necessary information read from the ROM 109 and the device query response received in step S105, and produces a confirmation screen for receiving a confirmation input as to whether or not a location query about the music content being played back is made.

Second, the CPU 130 displays the produced confirmation screen on the display unit 113 through the display control unit 112, and receives a confirmation input through the key operation unit 114 as to whether or not a location query about the content being played back is made.

In step S107, the CPU 130 determines whether or not an instruction for making a location query about the music content being played back has been given (step S108). If it is determined in step S108 that there is no instruction for making a location query about the music content being played back, the process shown in FIG. 8 ends.

If it is determined in step S108 that an instruction for making a location query about the music content being played back has been given, the CPU 130 generates a location query request, and sends the location query request to the LAN 500 (step S109). Specifically, the location query request is sent to the LAN 500 through the LAN module 118 and the LAN transmitting/receiving antenna 119.

The location query request sent in step S109 may have the layout described with reference to FIG. 6C.

Upon delivering the location query request about the music content being played back, the CPU 130 produces a screen display indicating that the query is in progress, and displays the screen display on the display screen of the display unit 113 through the display control unit 112 (step S110).

Then, the CPU 130 receives a location query response through the LAN transmitting/receiving antenna 119 and the LAN module 118 (step S111), and determines whether or not a location query response has been received (step S112). The location query response received in step S111 may have the layout described with reference to FIG. 7A.

If it is determined in step S112 that no location query response has yet been received, the processing after step S111 is repeated. If it is determined in step S112 that a location query response has been received, the following process is performed (step S113).

In step S113, the CPU 130 produces a confirmation screen for downloading the music content being played back, and displays the confirmation screen on the display unit 113 through the display control unit 112. A confirmation input as to whether or not the music content is to be downloaded is received through the key operation unit 114.

Specifically, in step S113, the following two sub-processes (a process for producing a confirmation screen and a process for displaying the confirmation screen and receiving a confirmation input).

First, the CPU 130 produces a confirmation screen based on the necessary information read from the ROM 109 and the location query response received in step S111. The confirmation screen is used for notification about the location of the music content being played back and for the receipt of a confirmation input as to whether or not the music content being played back is to be downloaded.

Second, the CPU 130 displays this confirmation screen on the display unit 113 through the display control unit 112, and receives a confirmation input through the key operation unit 114 as to whether or not the music content being played back is to be downloaded.

In step S113, the CPU 130 determines whether or not an instruction for downloading the music content being played back has been given (step S114). If it is determined in step S114 that there is no instruction for downloading the music content being played back, the process shown in FIG. 8 ends.

If it is determined in step S114 that an instruction for downloading the music content being played back has been given, the CPU 130 generates a provision request (download request) for providing (downloading) the music content being played back, and sends the provision request to the LAN 500 (step S115). Specifically, a provision request for providing the music content being played back is delivered to the LAN 500 through the LAN module 118 and the LAN transmitting/receiving antenna 119.

The download request sent in step S115 may have the layout described with reference to FIG. 7B. Upon delivering the download request for downloading the music content being played back, the CPU 130 produces a screen display indicating that the download of the music content is in progress, and displays the screen display on the display screen of the display unit 113 through the display control unit 112 (step S116).

Then, the CPU 130 receives the requested music content being played back through the LAN transmitting/receiving antenna 119 and the LAN module 118 (step S117), and determines whether or not all the music content has been received (step S118). The music content received in step S111 may have the layout described with reference to FIG. 7C.

If it is determined in step S118 that all the music content has not yet been received, the processing after step S117 is repeated. If it is determined in step S118 that all the desired music content has been received, the process shown in FIG. 8 ends.

As can also be seen from the flowchart shown in FIG. 8, in the mobile phone terminal 100 according to the first embodiment, first, a device that is connected to the LAN 500 and that is playing back music content is specified. Then, the specified device that is playing back music content is queried for the location of the music content being played back to specify the location of the music. Then, the specified device where the music content is located is requested to provide the music content, and the music content is downloaded therefrom.

Therefore, the user of the mobile phone terminal 100 can download the music content being played back without being conscious of the location of the music content being played back.

Operation of Music Playback Device 300

Next, the operation of the music playback device 300 and the personal computer 400 in the home network system according to the first embodiment will be described in detail. In the first embodiment, the process performed in the music playback device 300 and the process performed in the personal computer 400 are basically the same or similar. Thus, in the following, for simplicity of description, the operation of the music playback device 300 will be described.

Figure 9:
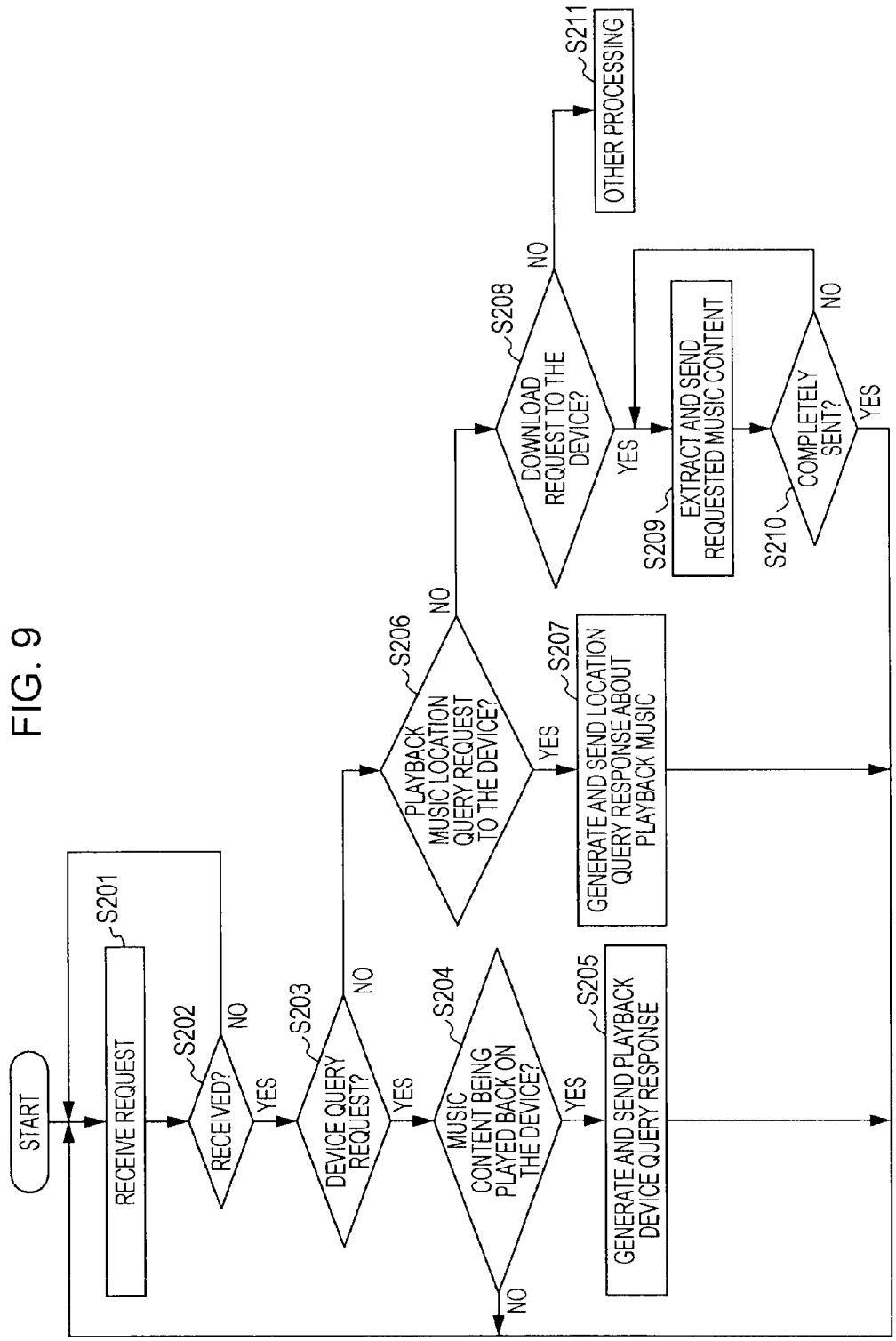
FIG. 9 is a flowchart for illustrating the operation of the music playback device.

FIG. 9 is a flowchart for illustrating the operation of the music playback device 300. The process shown in FIG. 9 is a process executed in the control unit 310 of the music playback device 300. This process is executed when the power of the music playback device 300 connected to the LAN 500 is turned on.

Then, the control unit 310 receives a request from another device connected to the LAN 500 through the LAN I/F 303 (step S201). Then, it is determined whether or not a request from another device has been received (step S202). When it is determined that no response has been received, the processing after step S201 is repeated.

If it is determined in step S202 that a request from another device has been received, the control unit 310 determines whether or not the received request is a device query request (step S203).

If it is determined in step S203 that the received request is a device query request (FIG. 6A), the control unit 310 determines whether or not music content is being played back on the music playback device 300 (step S204).

If it is determined in step S204 that music content is being played back on the music playback device 300, a device query response (FIG. 6B) indicating that the music playback device 300 is playing back music content is generated and is sent to the requesting device (step S205).

If it is determined in step S204 that music content is not being played back on the music playback device 300, it is not necessary to respond to the request, and the processing after step S201 is repeated.

If it is determined in step S203 that the received request is not a device query request (FIG. 6A), the control unit 310 determines whether or not the received request is a location query request about music content being played back (FIG. 6C) whose destination is the music playback device 300 (step S206).

If it is determined in step S206 that the received request is a music-content location query request whose destination is the music playback device 300, a location query response (FIG. 7A) about music content being played back on the music playback device 300 is generated and is sent to the requesting device (step S207). Then, the processing after step S201 is repeated.

If it is determined in step S206 that the received request is not a music-content location query request whose destination is the music playback device 300, it is determined whether or not the received request is a music-content download request (provision request) whose destination is the music playback device 300 (FIG. 7B) (step S208).

If it is determined in step S208 that the received request is a music-content download request whose destination is the music playback device 300, the control unit 310 extracts the requested music content from a recording medium incorporated in the music playback device 300, and sends the music content to the requesting device (step S209).

Then, the control unit 310 determines whether or not all requested music content has been completely sent (step S210). If it is determined that all requested music content has not been completely sent, the processing after step S209 is repeated, and the music content is continuously sent.

If it is determined in step S210 that all requested music content has been completely sent, the control unit 310 repeats the processing after step S201.

If it is determined in step S208 that the received request is not a music-content download request whose destination is the music playback device 300, the control unit 310 performs another process according to the received request.

While the process shown in FIG. 9 has been described in the context of the operation of the music playback device 300, the personal computer 400 also performs a process similar to the process shown in FIG. 9.

As described with reference to FIG. 9, the music playback device 300 and the personal computer 400 provide information in accordance with a request from the mobile phone terminal 100. Therefore, the mobile phone terminal 100 can obtain desired information.

Screen Transitions on Mobile Phone Terminal 100

Next, a specific example of the transitions of the screen display on the mobile phone terminal 100 according to the present embodiment, which operates in the manner described with reference to the flowchart shown in FIG. 8, will be described. FIGS. 10A to 10F are diagrams for illustrating an example of screen transitions on the mobile phone terminal 100 according to the first embodiment.

Figure 10:
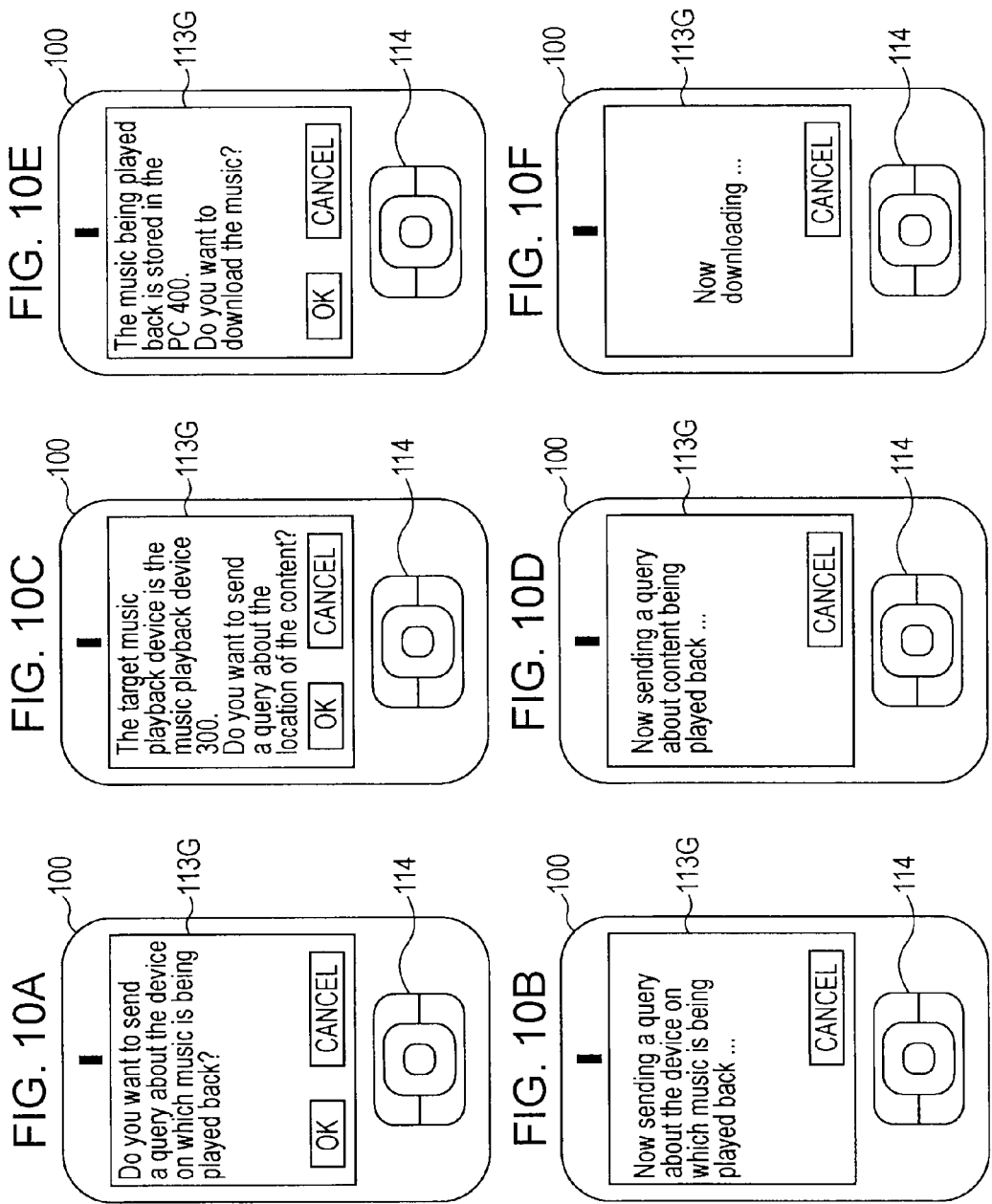
FIGS. 10A to 10F are diagrams for illustrating an example of screen transitions on the mobile phone terminal according to the first embodiment.

As described above, when a predetermined operation input from a user is received and the process shown in FIG. 8 is executed, in step S101 shown in FIG. 8, a confirmation screen for a playback device query shown in FIG. 10A is displayed on a display screen 113G of the display unit 113 of the mobile phone terminal 100.

The operation for terminating the playback device query (the operation of selecting a cancel icon displayed) is performed on the confirmation screen for the playback device query shown in FIG. 10A using the key operation unit 114. Accordingly, the process shown in FIG. 8 ends.

The operation for making a playback device query (the operation of selecting an OK icon displayed) is performed on the confirmation screen for the playback device query shown in FIG. 10A using the key operation unit 114. Accordingly, a device query request is generated and sent. Then, in step S104 shown in FIG. 8, a screen shown in FIG. 10B indicating that the playback device query is in progress is displayed on the display screen 113G of the display unit 113 of the mobile phone terminal 100.

Thereafter, when the mobile phone terminal 100 receives a device query response, in step S107 shown in FIG. 8, a confirmation screen shown in FIG. 10C for a location query about the music content being played back is displayed on the display screen 113G of the display unit 113 of the mobile phone terminal 100.

The operation for terminating the location query (the operation of selecting a cancel icon displayed) is performed on the confirmation screen shown in FIG. 10C for the location query about the music content using the key operation unit 114. Then, the process shown in FIG. 8 ends.

The operation for making a location query (the operation of selecting an OK icon displayed) is performed on the confirmation screen shown in FIG. 10C for query about the location of the music content using the key operation unit 114. Accordingly, a music-content location query request is generated and sent. Then, in step S110 shown in FIG. 8, a screen shown in FIG. 10D indicating that the location query is in progress is displayed on the display screen 113G of the display unit 113 of the mobile phone terminal 100.

Thereafter, when the mobile phone terminal 100 receives a location query response, in step S113 shown in FIG. 8, a confirmation screen shown in FIG. 10E for a download request (provision request) for downloading (providing) the music content being played back is displayed on the display screen 113G of the display unit 113 of the mobile phone terminal 100.

The operation for terminating the download operation (the operation of selecting a cancel icon displayed) is performed on the confirmation screen shown in FIG. 10E for the music-content download request using the key operation unit 114. Then, the process shown in FIG. 8 ends.

The operation for performing a download operation (the operation of selecting an OK icon displayed) is performed on the confirmation screen shown in FIG. 10E for the music-content download request using the key operation unit 114. Accordingly, a music-content download request (provision request) is generated and sent. Then, in step S116 shown in FIG. 8, a screen shown in FIG. 10F indicating that the download is in progress is displayed on the display screen 113G of the display unit 113 of the mobile phone terminal 100.

In the mobile phone terminal 100, therefore, when a playback device query, a music-content location query, or a music-content download request is made, it can be determined whether or not to make a query or request in accordance with the screen display.

Then, after a device query request, a music-content location query request, or a music-content download request (provision request) is delivered, for a period until a desired response has been received, the user can be clearly notified of what process is being currently performed. This can ease the anxiety of the user of the mobile phone terminal 100.

In the process shown in FIG. 8, in the foregoing description, when the processing-in-progress display is made in step S104, step S110, and step S116, the termination of the processing is not allowed during the processing-in-progress display.

However, as shown in FIGS. 10B, 10D, and 10E, a cancel icon is provided in the processing-in-progress display for an individual process. When the cancel icon is selected, the process shown in FIG. 8 can be forcibly terminated.

First Modification

In the home network system according to the first embodiment described above, only music content being played back by a device connected to the LAN 500 is downloaded to the mobile phone terminal 100. However, the embodiment is not limited thereto.

Instead of song-by-song download, other types of download can also be available. For example, an entire album including music content being played back can be downloaded, or music content provided by the artist of the music content being played back can be collectively downloaded.

Figure 11:
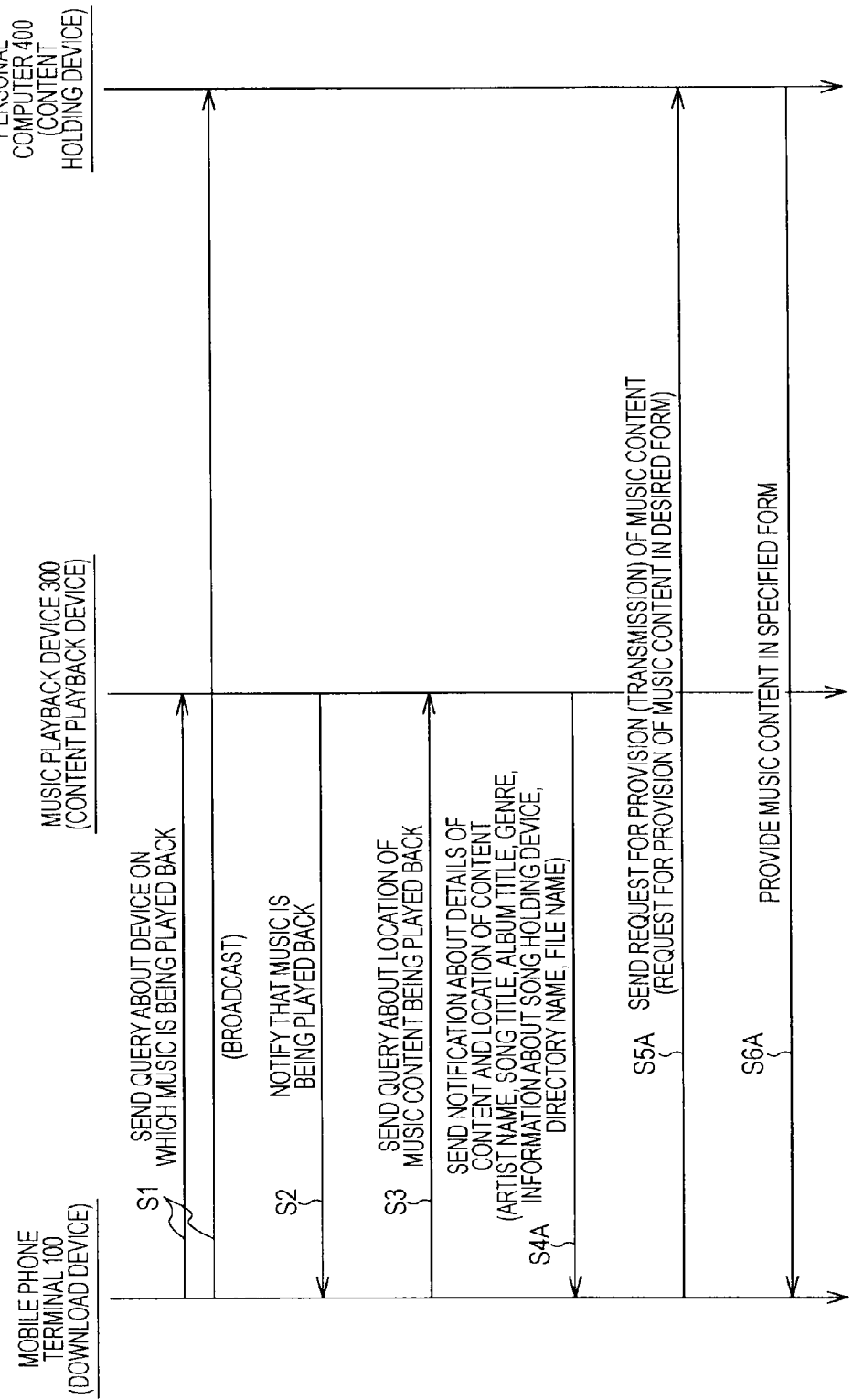
FIG. 11 is a sequence diagram for illustrating a process in a first modification of the first embodiment.

FIG. 11 is a sequence diagram for illustrating a process in a first modification of the first embodiment. The sequence diagram shown in FIG. 11 is basically the same as or similar to the sequence diagram show in FIG. 5. Thus, in FIG. 11, processing steps performed in a manner similar to those shown in FIG. 5 are assigned the same reference numerals, and the descriptions thereof are omitted.

In the first modification, in step S4A shown in FIG. 11, the music playback device 300 that is playing back music content sends not only a notification about the location of the music content but also a notification about the details of the music content being played back.

Specifically, as also shown in FIG. 11, a notification about detailed information concerning the music content being played back, such as the artist name, song title, album title, and genre, is sent. Further, a notification about location information such as the device name of the device that holds the music content, MAC address, IP address, directory name, and file name is also sent.

Thus, the mobile phone terminal 100 can have knowledge of the details of the music content being played back as well as the location of the music content being played back.

In step S5A shown in FIG. 11, the mobile phone terminal 100 makes a request for downloading the music content whose location has been identified. In this case, the user can select the download of only the music content being played back, the download of the entire album including the music content being played back, or the download of music content provided by the artist of the music content being played back.

In step S5A shown in FIG. 11, the user of the mobile phone terminal 100 sends a download request for downloading music content in the desired form to the device that holds the music content being played back (in the first embodiment, the personal computer 400).

In accordance with the request, in step S6A shown in FIG. 11, the requested music content is sent from the device that holds the music content being played back to the requesting device in the form designated by the download request in step S5A.

Operation of Mobile Phone Terminal 100 in First Modification

Next, the operation of the mobile phone terminal 100 in the first modification of the first embodiment, an overview of which has been described with reference to FIG. 11, will be specifically described with reference to FIGS. 12 to 14B.

The mobile phone terminal 100 in the first modification performs the processing of steps S101 to S112 shown in FIG. 8 in a manner similar to that of the mobile phone terminal 100 according to the first embodiment. The mobile phone terminal 100 in the first modification performs the processing after step S113 in a manner different from that in the process shown in FIG. 8.

Here, for simplicity of description, the operation of the mobile phone terminal 100 in the first modification will be described in the context of the processing after step S111 in the process shown in FIG. 8.

Figure 12:
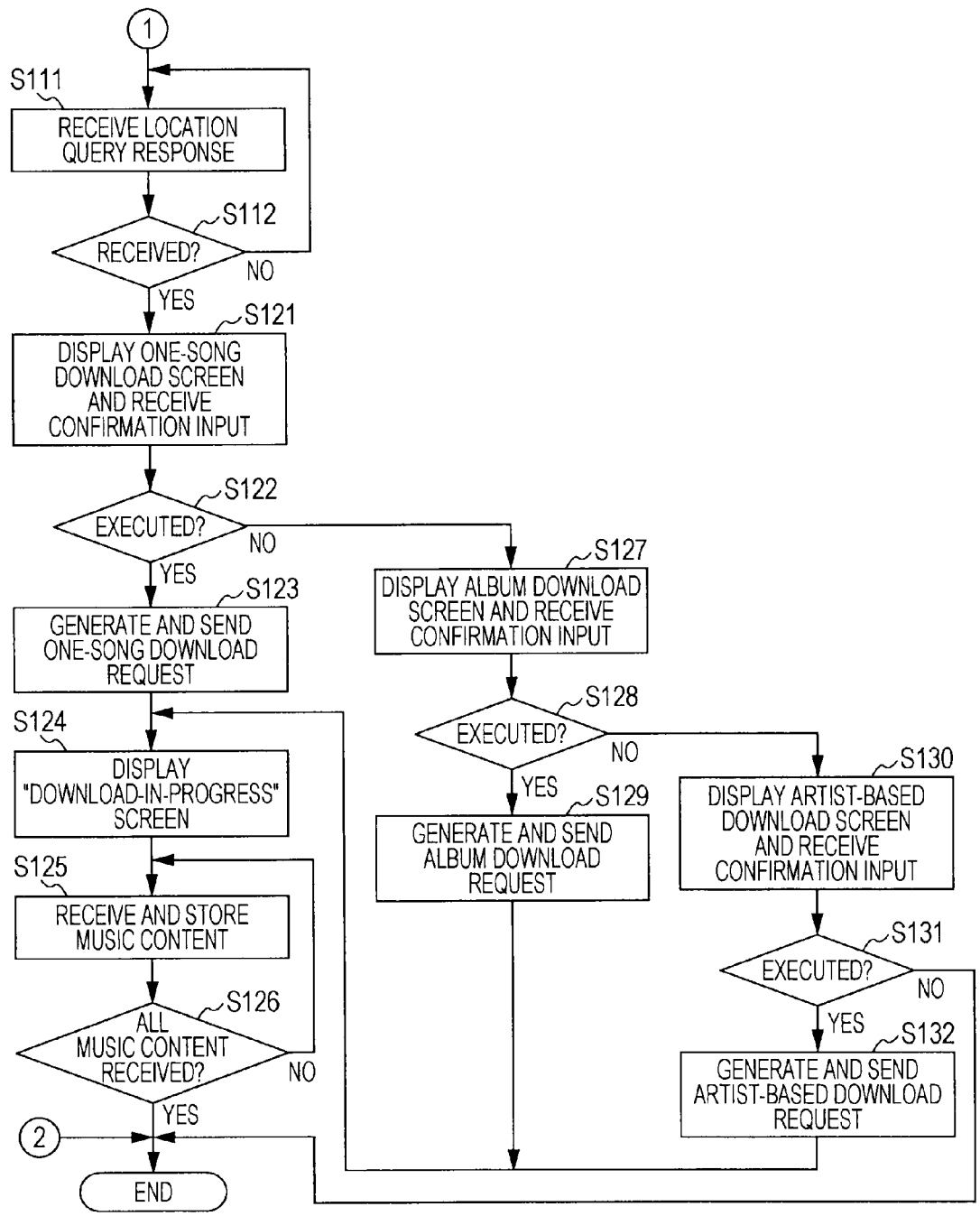
FIG. 12 is a flowchart for illustrating the operation of the mobile phone terminal in the first modification.

FIG. 12 is a flowchart for illustrating the operation of the mobile phone terminal 100 in the first modification. As also described above, the process in the flowchart shown in FIG. 12 corresponds to the process after step S111 shown in FIG. 8.

Figure 13A:
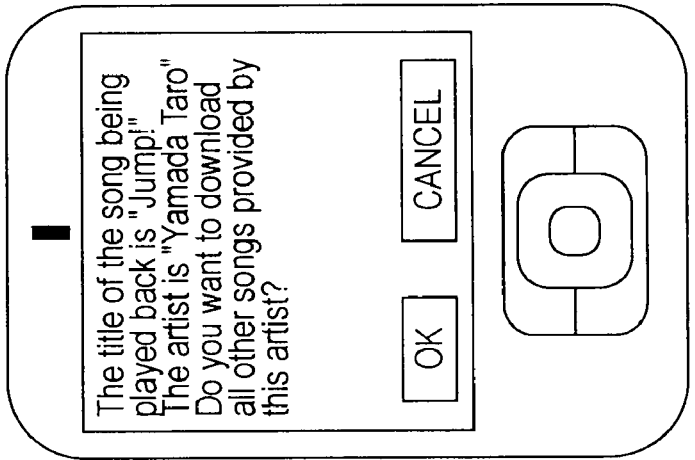
FIGS. 13A to 13C are diagrams showing an example display of a display screen displayed on a display screen of a display unit of the mobile phone terminal in the process shown in FIG. 12.
Figure 13B:
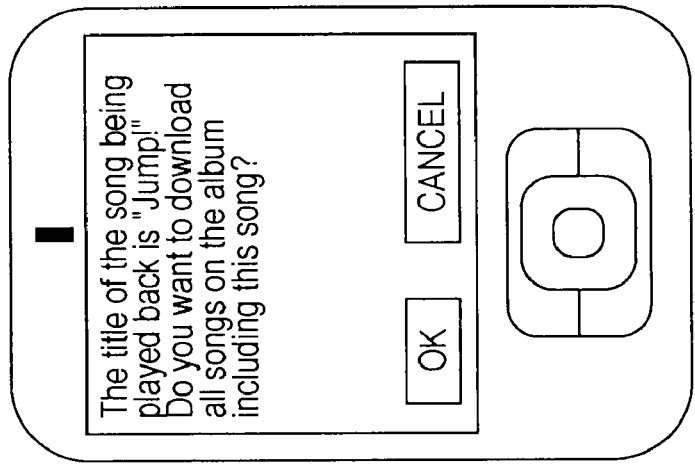
Figure 13C:
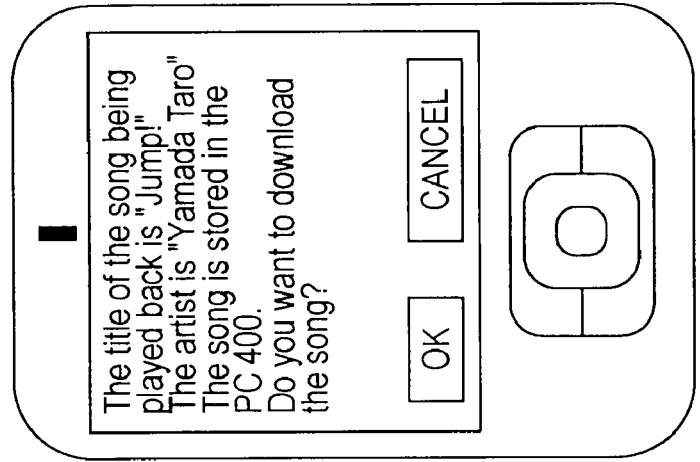
Figure 18:
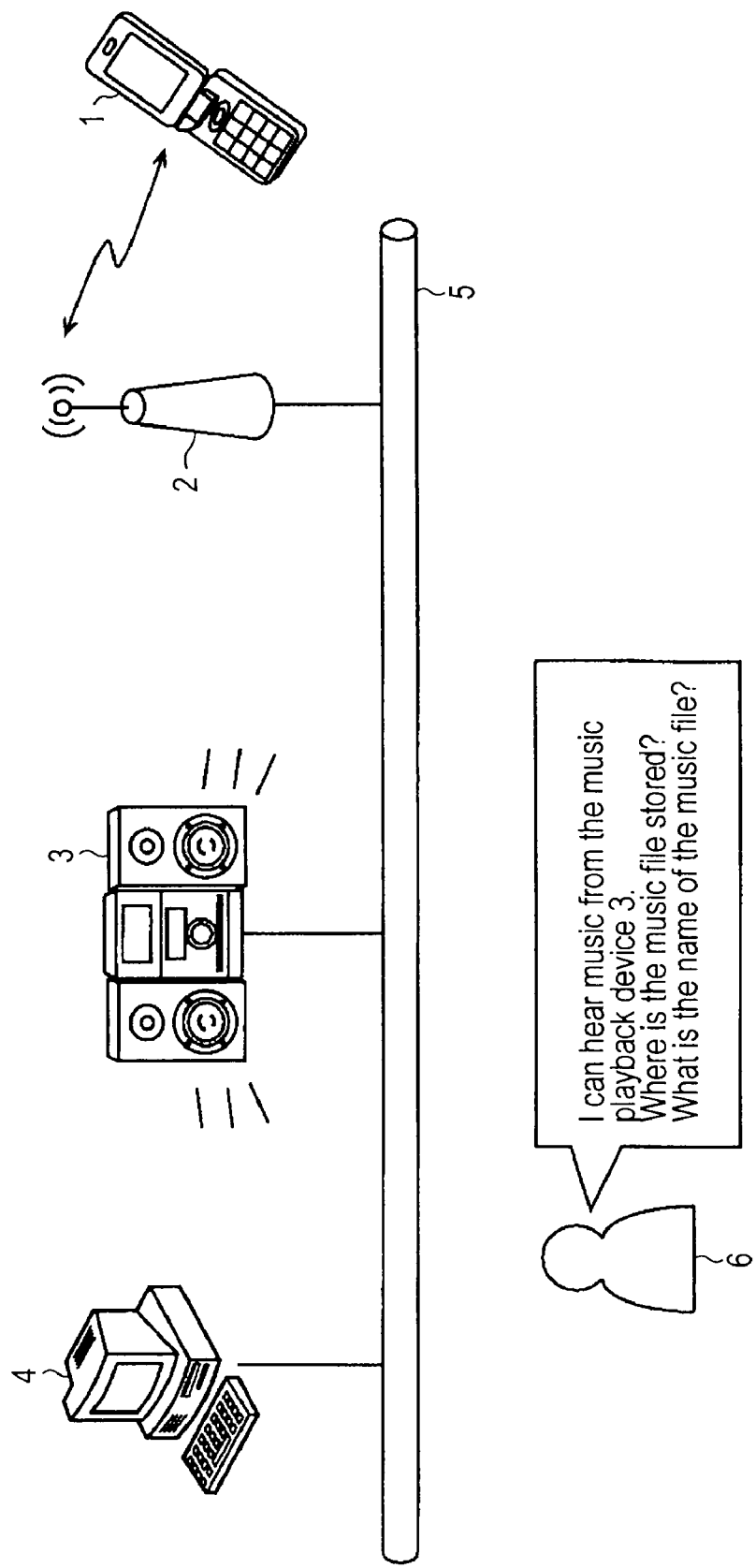
FIG. 18 is a diagram for illustrating an example configuration of a home network system of the related art for a DLNA-compliant consumer electronic device.

FIGS. 13A to 13C are diagrams showing an example display of a display screen displayed on the display screen 113G of the display unit 113 of the mobile phone terminal 100 in the process shown in FIG. 12. FIGS. 14A and 14B are diagrams showing an example layout of download requests (content provision requests) sent from the mobile phone terminal 100 to the content holding device, or the personal computer 400, in the process shown in FIG. 12.

As described with reference to FIG. 8, with the processing of steps S101 to S110, a location query request about music content being played back is sent from the mobile phone terminal 100 to the music playback device 300 that is playing back music.

Then, as also shown in FIG. 12, the CPU 130 receives a location query response through the LAN transmitting/receiving antenna 119 and the LAN module 118 (step S111), and determines whether or not a location query response has been received (step S112). The location query response received in step S111 may have the layout described with reference to FIG. 7A.

If it is determined in step S112 that no location query response has yet been received, the processing after step S111 is repeated. If it is determined in step S112 that a location query response has been received, first, the CPU 130 displays a one-song download screen, and receives a confirmation input (step S121).

The processing of step S121 allows the user of the mobile phone terminal 100 to select whether or not to download only the music content item or song being played back. As shown in FIG. 13A, the one-song download screen displayed in step S121 notifies the user of the song title, artist name, and storage location of the music content being played back, and also prompts the user to select whether or not to download only this music content.

Then, the CPU 130 determines whether or not an instruction for downloading only the music content item or song being played back has been received in step S121 (step S122). The processing of step S122 allows the determination as to whether or not an instruction for downloading only the music content item or song being played back has been issued (the operation of selecting an OK icon has been performed) on the screen shown in FIG. 13A.

If it is determined in step S122 that an instruction for downloading only the music content item or song being played back has been issued, the CPU 130 generates a one-song download request, and delivers the one-song download request to the LAN 500 (step S123).

Specifically, a download request for downloading only the music content being played back is delivered to the LAN 500 through the LAN module 118 and the LAN transmitting/receiving antenna 119. The download request delivered in step S123 may have the layout described with reference to FIG. 7B.

Then, upon delivering the download request (provision request) for downloading (providing) the music content being played back, the CPU 130 produces a screen display indicating that the download of the music content is in progress, and displays the screen display on the display screen of the display unit 113 through the display control unit 112 (step S124).

Then, the CPU 130 receives the requested music content being played back through the LAN transmitting/receiving antenna 119 and the LAN module 118 (step S125), and determines whether or not all the music content has been received (step S126).

If it is determined in step S126 that all the music content has not yet been received, the processing after step S124 is repeated. If it is determined in step S126 that all the desired music content has been received, this process ends.

If it is not determined in step S122 that no instruction has been issued for downloading only the music content item or song being played back, the CPU 130 displays an album download screen, and receives a confirmation input (step S127).

Specifically, if a cancel icon has been selected on the one-song download screen in step S121, it is determined in step S122 that no instruction has been issued for downloading only the music content item or song being played back, and the processing of step S127 is performed.

The processing of step S127 allows the user of the mobile phone terminal 100 to select whether or not to download the entire album including the music content being played back. As shown in FIG. 13B, the album download screen displayed in step S127 notifies the user of the song title of the music content being played back, and also prompts the user to select whether or not to download the entire album including this music content.

While FIG. 13B provides the notification of only the song title, the notification of the artist name or the storage location of the music content can also be sent.

The CPU 130 determines whether or not an instruction for downloading the entire album including the music content being played back has been received in step S127 (step S128). The processing of step S128 allows the determination as to whether or not an instruction for downloading the entire album including the music content being played back has been issued (the operation of selecting an OK icon has been performed) on the screen shown in FIG. 13B.

If it is determined in step S128 that an instruction for downloading the entire album including the music content being played back has been issued, the CPU 130 generates an album download request, and sends the album download request to the LAN 500 (step S129).

Specifically, a download request for downloading the entire album including the music content being played back is sent to the LAN 500 through the LAN module 118 and the LAN transmitting/receiving antenna 119. The download request sent in step S129 may have a layout shown in FIG. 14A.

As shown in FIG. 14A, the request sent in step S129 has a source ID and a destination ID, and also has, as content to be sent, a provision request for providing the entire album including the music content being played back. In this example, the ID of the mobile phone terminal 100 and the ID of the personal computer 400 are entered as the source ID and the destination ID, respectively.

Then, after the processing of step S129, the processing after step S124 described above is performed.

If it is determined in step S128 that no instruction has been issued for downloading the album including the music content being played back, the CPU 130 displays an artist-based download screen, and receives a confirmation input (step S130).

Specifically, if a cancel icon has been selected on the album download screen in step S127, it is determined in step S128 that no instruction has been issued for downloading the entire album including the music content being played back, and the processing of step S130 is performed.

The processing of step S130 allows the user of the mobile phone terminal 100 to select whether or not to collectively download music content provided by the artist of the music content being played back.

As shown in FIG. 13C, the artist-based download screen displayed in step S130 notifies the user of the artist name of the music content being played back, and also prompts the user to select whether or not to collectively download music content provided by this artist.

While FIG. 13C provides the notification of only the artist name, the notification of the song title or the storage location of the music content can also be sent.

The CPU 130 determines whether or not an instruction for collectively downloading music content provided by the artist of the music content being played back has been received in step S130 (step S131). The processing of step S131 allows the determination as to whether or not an instruction for collectively downloading music content provided by the artist of the music content being played back has been issued (the operation of selecting an OK icon has been performed) on the screen shown in FIG. 13C.

If it is determined in step S131 that an instruction for collectively downloading music content provided by this artist has been issued, the CPU 130 generates an artist-based download request, and sends the artist-based download request to the LAN 500 (step S132).

Specifically, the artist-based download request is delivered to the LAN 500 through the LAN module 118 and the LAN transmitting/receiving antenna 119. The download request sent in step S132 may have a layout shown in FIG. 14B.

As shown in FIG. 14B, the request delivered in step S132 has, as well as a source ID and a destination ID, as content to be sent, a download request for requesting that music content provided by the artist of the music content being played back be collective downloaded. In this example, the ID of the mobile phone terminal 100 and the ID of the personal computer 400 are entered as the source ID and the destination ID, respectively.

Then, after the processing of step S132, the processing after step S124 described above is performed.

If it is determined in step S131 that no instruction has been issued for collectively downloading music content provided by this artist, the CPU 130 ends this process (the processing of steps S101 to S112 in FIG. 8 and the process shown in FIG. 12).

In the first modification, therefore, the mobile phone terminal 100 can download music content that is being played back by a device connected to the LAN 500. In addition, the mobile phone terminal 100 can also download an entire album including the music content being played back or can collectively download music content provided by the artist of the music content being played back.

Other types of downloading can also be performed, such as mainly downloading recent hit songs among items of music content in the genre to which the item of music content being played back belongs and downloading items of music content sold around the same time as the item of music content being played back.

In summary, with the use of various types of information (metadata) contained in music content stored and held, music content extractable under various conditions can be downloaded.

Second Modification

In the first embodiment described above, a query about a device that is playing back music is made. When the device that is playing back music is identified, the device is queried for the location of the music content being played back.

In actuality, however, prior to making a query about the location of the music content being played back, a user may wish to have knowledge of detailed information about the music content being played back. For example, once a user has knowledge of the song title or artist name of the music content being played back, the user may be able to determine whether or not the music content has already been stored and held in the user's mobile phone terminal 100.

In a second modification of the first embodiment, the mobile phone terminal 100 makes, first, a query about a device that is playing back music, followed by a query about detailed information of the music being played back, and then a query about the location of the music being played back.

FIG. 15 is a sequence diagram for illustrating a process in a second modification of the first embodiment. In the second modification, first, the CPU 130 of the mobile phone terminal 100 generates a device query request, and sends the device query request to all devices connected to the LAN 500 through the LAN module 118 and the LAN transmitting/receiving antenna 119 (step S111). The device query request is sent to the music playback device 300 and the personal computer 400 through the wireless router 200 and the LAN 500.

In the home network system according to the first embodiment, as also described above, the music playback device 300 is playing back music content provided from the personal computer 400. Thus, the control unit 310 of the music playback device 300 generates a device query response indicating that the music playback device 300 is a device that is playing back the music content, and sends the device query response to the requesting mobile phone terminal 100 through the LAN I/F 303 and the LAN connection terminal 302 (step S12).

The device query response is sent to the mobile phone terminal 100 via the LAN 500 and the wireless router 200, and is received by the mobile phone terminal 100. Thus, the mobile phone terminal 100 can recognize that the music playback device 300 is the content playback device that is playing back the music content.

Then, the mobile phone terminal 100 generates a music detailed information provision request for requesting provision of information concerning the music being played back, and sends the music detailed information provision request to the music playback device 300 connected to the LAN 500 through the LAN module 118 and the LAN transmitting/receiving antenna 119 (step S13).

Upon receiving a music detailed information provision request whose destination is the music playback device 300 through the LAN connection terminal 302 and the LAN I/F 303, the music playback device 300 notifies the control unit 310 of the receipt of the request. The music playback device 300 has been in effect provided with the music content being played back, and the control unit 310 has knowledge of the music content being played back.

Specifically, the control unit 310 of the music playback device 300 has knowledge of content information such as the title, artist name, and genre of the music content being played back. Thus, upon receiving the music detailed information provision request, the control unit 310 of the music playback device 300 generates a detailed information response about the music content being played back, and sends the detailed information response to the requesting mobile phone terminal 100 through the LAN I/F 303 and the LAN connection terminal 302 (step S14).

The detailed information response generated here includes information such as the artist name, song title, album title, and genre of the music content being played back. Thus, the mobile phone terminal 100 can recognize the details of the music content being played back. The detailed information recognized here can be displayed on the display screen of the display unit 113 so that the user can be notified of the detailed information.

Then, the mobile phone terminal 100 generates a location query request about the music being played back, and sends the location query request to the music playback device 300 connected to the LAN 500 through the LAN module 118 and the LAN transmitting/receiving antenna 119, which is the device that is playing back the music content (step S15).

Upon receiving a music-content location query request whose destination is the music playback device 300 through the LAN connection terminal 302 and the LAN I/F 303, the music playback device 300 notifies the control unit 310 of the receipt of the request. The music playback device 300 has been in effect provided with the music content being played back in the manner described above, and the control unit 310 has knowledge of where the music content being played back is located.

Thus, upon receiving the location query request, the control unit 310 of the music playback device 300 generates a location query response about the music content being played back, and sends the location query response to the requesting mobile phone terminal 100 through the LAN I/F 303 and the LAN connection terminal 302 (step S16).

The location query response generated here may be information that can represent at least within which device, in which folder, and under which file name the music content being played back is stored.

The location query response is sent to the mobile phone terminal 100 via the LAN 500 and the wireless router 200, and is received by the mobile phone terminal 100. In the first embodiment, as also described above, the music playback device 300 is playing back music content provided from the personal computer 400.

Thus, based on the location query response from the music playback device 300, the mobile phone terminal 100 can recognize that the music content being played back is held in the personal computer 400 and can also recognize the folder name and the file name under which the music content being played back is stored.

The CPU 130 of the mobile phone terminal 100 generates, based on the location query response, a provision request for requesting the personal computer 400 to provide the music content being played back by the music playback device 300, and sends the provision request to the personal computer 400 (step S17).

In step S17, the provision request generated by the CPU of the mobile phone terminal 100 is sent to the personal computer 400 connected to the LAN 500 through the LAN module and the LAN transmitting/receiving antenna 119.

Upon receiving a music-content provision request whose destination is the personal computer 400 through the LAN connection terminal 403 and the LAN I/F 404, the personal computer 400 notifies the control unit 410 of the receipt of the request. In accordance with the received provision request, the control unit 410 of the personal computer 400 reads the specified music content from the hard disk in the HDD 405, and sends the music content to the requesting mobile phone terminal 100 (step S18).

The music content read from the hard disk in the HDD by the control unit 410 is converted into data of a transmission format. Then, the resulting data is delivered to the LAN 500 through the LAN I/F 404 and the LAN connection terminal 403, and is sent to the mobile phone terminal 100.

This allows the mobile phone terminal 100 to download the music content being played back by the music playback device 300 from the personal computer 400 that holds the music content.

In this case, it is not necessary for the user of the mobile phone terminal 100 to recognize on which device the music content being played back is being played back, or recognize which device actually holds the music content being played back. The mobile phone terminal 100 performs communication with devices connected to the LAN 500, thereby quickly and accurately recognizing the location of the music content being played back. Thus, desired music content can be downloaded.

Also, detailed information concerning the music content being played back can be obtained. Therefore, the user of the mobile phone terminal 100 can check the detailed information, and can effectively use the detailed information to determine whether or not the music content being played back is music content to be downloaded.

Third Modification

In the home network system according to the first embodiment described above, each of the music playback device 300 and the personal computer 400 can potentially serve as both a content playback device and a content holding device. Thus, the mobile phone terminal 100 makes a playback device query in order to recognize which device is playing back music content.

However, if the music playback device used by the user of the mobile phone terminal 100 is explicitly determined, it is not necessary to make a playback device query. In this manner, if the music playback device used by the user of the mobile phone terminal 100 is determined by default, the music playback device to be used as a content playback device may be initially queried for the location of the music content being played back.

In the timing chart shown in FIG. 5, therefore, if a device that is determined to be used as a content playback device is the music playback device 300, the processing after step S3 may be performed.

In this case, a music playback device used by default may be registered in the mobile phone terminal 100. Thus, a location query request about the music content being played back can be directly sent to the music playback device.

Others

In the first embodiment described above, the personal computer 400 has been described as a content holding device. In some cases, however, the music playback device 300 may be playing back music content from a recording medium incorporated therein.

In such cases, the content is located in the music playback device 300, and the mobile phone terminal 100 is notified that the music playback device 300 is the device that holds the music content being played back.

Thus, the mobile phone terminal 100 requests the music playback device 300 to provide the music content. However, even in these cases, the only difference is the destination of the content provision request and there is no large difference in processes.

Second Embodiment

In the home network system according to the first embodiment described above, one content playback device is used by way of example. In actuality, however, a large number of devices may be connected to the LAN 500, and a plurality of content playback devices may be playing back music content at the same time. In this case, there is a problem in that it is difficult to determine to which content playback device to send a request.

In a home network system according to a second embodiment of the present invention, even in a case where a plurality of content playback devices connected to the same LAN are playing back music content at the same time, the user of the mobile phone terminal 100 can select to which content playback device to send a request.

In the second embodiment, another music playback device 300 is further connected to the home network system shown in FIG. 1, by way of example. That is, by way of example, a mobile phone terminal 100 accesses, via a wireless router 200, a LAN 500 to which music playback devices 300A and 300B and a personal computer 400 are connected.

The mobile phone terminal 100 has a configuration similar to that described with reference to FIG. 2. Each of the music playback devices 300A and 300B has a configuration similar to that described with reference to FIG. 3. The personal computer 400 has a configuration similar to that described with reference to FIG. 4.

FIG. 16 is a sequence diagram for illustrating a process in the home network system according to the second embodiment. In the home network system according to the second embodiment, it is assumed that the music playback devices 300A and 300B are playing back music content.

Also in the home network system according to the second embodiment, first, the CPU 130 of the mobile phone terminal 100 generates a device query request, and sends the device query request to all devices connected to the LAN 500 (step S21).

Specifically, the device query request is sent to the music playback devices 300A and 300B and the personal computer 400 through the LAN module 118, the LAN transmitting/receiving antenna 119, the wireless router 200, and the LAN 500.

Also in the home network system according to the second embodiment, the music playback devices 300A and 300B are playing back music content provided from the personal computer 400.

Thus, the control unit 310 of each of the music playback devices 300A and 300B generates a device query response indicating that the corresponding music playback device 300A or 300B is a device that is playing back music content, and sends the device query response to the requesting mobile phone terminal 100 through the LAN I/F 303 and the LAN connection terminal 302 (steps S22 and S23).

The device query responses are sent to the mobile phone terminal 100 via the LAN 500 and the wireless router 200, and are received by the mobile phone terminal 100. Thus, the mobile phone terminal 100 can recognize that the music playback devices 300A and 300B are content playback devices that are playing back music content.

Then, the mobile phone terminal 100 generates a music detailed information provision request for requesting provision of information concerning the music being played back, and sends the music detailed information provision request to the music playback devices 300A and 300B (steps S24 and S25). The music detailed information provision request is sent to the music playback devices 300A and 300B connected to the LAN 500 through the LAN module 118 and the LAN transmitting/receiving antenna 119.

Upon receiving a music detailed information provision request whose destination is the music playback devices 300A and 300B through the LAN connection terminal 302 and the LAN I/F 303, each of the music playback devices 300A and 300B notifies the control unit 310 of the receipt of the request.

Each of the music playback devices 300A and 300B has been in effect provided with the music content being played back, and the control unit 310 has knowledge of the music content being played back.

Specifically, the control unit 310 of each of the music playback devices 300A and 300B has knowledge of content information such as the title, artist name, and genre of the music content being played back.

Thus, upon receiving the music detailed information provision request, the control unit 310 of each of the music playback devices 300A and 300B generates a detailed information response about the music content being played back, and sends the detailed information response to the requesting mobile phone terminal 100 through the LAN I/F 303 and the LAN connection terminal 302 (steps S26 and S27).

The detailed information response generated here includes information such as the artist name, song title, album title, and genre of the music content being played back. Thus, the mobile phone terminal 100 can recognize the details of the music content being played back on each of the music playback devices 300A and 300B.

Then, the CPU 130 of the mobile phone terminal 100 displays, based on the detailed information response from each of the music playback devices 300A and 300B, a list of items of music content being played back, and receives a selection input of a music content (step S28).

In step S28, it is assumed that the music content being played back on the music playback device 300A has been selected. The selection of music content being played back allows the specification of the content playback device that is playing back this music content. The detailed information response has, like other requests or responses, a source ID and a destination ID, and the source ID can be used to specify the content playback device associated with the selected music content.

The mobile phone terminal 100 generates a location query request about the music being played back, and sends the location query request to the music playback device 300A that is playing back the selected music content (step S29). This location query request is delivered to the LAN 500 through the LAN module 118 and the LAN transmitting/receiving antenna 119.

The selected music playback device 300A, upon receiving a music-content location query request whose destination is the music playback device 300A through the LAN connection terminal 302 and the LAN I/F 303, notifies the control unit 310 of the receipt of the request. The music playback device 300A has been in effect provided with the music content being played back in the manner described above, and the control unit 310 has knowledge of where the music content being played back is located.

Thus, upon receiving the location query request, the control unit 310 of the music playback device 300A generates a location query response about the music content being played back, and sends the location query response to the requesting mobile phone terminal 100 through the LAN I/F 303 and the LAN connection terminal 302 (step S30).

The location query response generated here may be information that can represent at least within which device, in which folder, and under which file name the music content being played back is stored.

The location query response is sent to the mobile phone terminal 100 via the LAN 500 and the wireless router 200, and is received by the mobile phone terminal 100. Also in the second embodiment, the music playback device 300A is playing back music content provided from the personal computer 400.

Thus, based on the location query response from the music playback device 300A, the mobile phone terminal 100 can recognize that the music content being played back is held in the personal computer 400 and can also recognize the folder name and the file name under which the music content being played back is stored.

The CPU 130 of the mobile phone terminal 100 generates, based on the location query response, a provision request for requesting the personal computer 400 to provide the music content being played back by the music playback device 300A, and sends the provision request to the personal computer 400 (step S31).

In step S31, the provision request generated by the CPU 130 of the mobile phone terminal 100 is sent to the personal computer 400 connected to the LAN 500 through the LAN module 118 and the LAN transmitting/receiving antenna 119.

Upon receiving a music-content provision request whose destination is the personal computer 400 through the LAN connection terminal 403 and the LAN I/F 404, the personal computer 400 notifies the control unit 410 of the receipt of the request. In accordance with the received provision request, the control unit 410 of the personal computer 400 reads the specified music content from the hard disk in the HDD 405, and sends the music content to the requesting mobile phone terminal 100 (step S32).

The music content read from the hard disk in the HDD 405 by the control unit 410 is converted into data of a transmission format. Then, the resulting data is delivered to the LAN 500 through the LAN I/F 404 and the LAN connection terminal 403, and is sent to the mobile phone terminal 100.

Thus, in a case where a plurality of music playback devices are connected to the same LAN and they are playing back music content at the same time, detailed information regarding the music content being played back on them is obtained.

Then, based on the detailed information, desired music content is selected. Thus, the music playback device that is playing back this music content is also identified, and is queried for the location of the content. Accordingly, the desired music content can be downloaded.

First Modification

As described above, in a case where a plurality of music playback devices are playing back music content at the same time, in order to select music content, it is necessary for the user of the mobile phone terminal 100 to have knowledge of the details of the music content.

However, the user may not necessarily have knowledge of the song title or artist name of the music content being played back. In this case, it is difficult to select music content. In a modification of the second embodiment, a music playback device itself is selectable.

FIG. 17 is a sequence diagram for illustrating a process in the modification of the second embodiment. Also in this modification, it is assumed that the music playback devices 300A and 300B are playing back music content.

Also in the modification of the second embodiment, first, the CPU 130 of the mobile phone terminal 100 generates a device query request, and sends the device query request to all devices connected to the LAN 500 (step S41).

Specifically, the device query request is sent to the music playback devices 300A and 300B and the personal computer 400 through the LAN module 118, the LAN transmitting/receiving antenna 119, the wireless router 200, and the LAN 500.

Also in a home network system according to the modification of the second embodiment, the music playback devices 300A and 300B are playing back music content provided from the personal computer 400.

Thus, the control unit 310 of each of the music playback devices 300A and 300B generates a device query response indicating that the corresponding music playback device 300A or 300B is a device that is playing back music content, and sends the device query response to the requesting mobile phone terminal 100 through the LAN I/F 303 and the LAN connection terminal 302 (steps S42 and S43).

The device query responses are sent to the mobile phone terminal 100 via the LAN 500 and the wireless router 200, and are received by the mobile phone terminal 100. Thus, the mobile phone terminal 100 can recognize that the music playback devices 300A and 300B are content playback devices that are playing back music content.

Then, the CPU 130 of the mobile phone terminal 100 displays, based on the device query response from each of the music playback devices 300A and 300B, a list of devices that are playing back music content, and receives a selection input of a content playback device (step S44). Since, as also described above, each of the playback device query responses has a source ID based on which devices that are playing back music content can be identified.

In step S44, it is assumed that the music playback device 300A has been selected. Then, the mobile phone terminal 100 generates a music detailed information provision request for requesting provision of information concerning the music being played back, and sends the music detailed information provision request to the music playback device 300A (step S45). The music detailed information provision request is sent to the music playback device 300A connected to the LAN 500 through the LAN module 118 and the LAN transmitting/receiving antenna 119.

Upon receiving a music detailed information provision request whose destination is the music playback device 300A through the LAN connection terminal 302 and the LAN I/F 303, the music playback device 300A notifies the control unit 310 of the receipt of the request. The music playback device 300A has been in effect provided with the music content being played back, and the control unit 310 has knowledge of the music content being played back. Specifically, the control unit 310 of the music playback device 300A has knowledge of content information such as the title, artist name, and genre of the music content being played back.

Thus, upon receiving the music detailed information provision request, the control unit 310 of the music playback device 300A generates a detailed information response about the music content being played back, and sends the detailed information response to the requesting mobile phone terminal 100 through the LAN I/F 303 and the LAN connection terminal 302 (step S46).

The detailed information response generated here includes information such as the artist name, song title, album title, and genre of the music content being played back. Thus, the mobile phone terminal 100 can recognize the details of the music content being played back by the music playback device 300A.

Then, the mobile phone terminal 100 generates a location query request about the music being played back, and sends the location query request to the selected music playback device 300A (step S47). This location query request is delivered to the LAN 500 through the LAN module 118 and the LAN transmitting/receiving antenna 119.

The selected music playback device 300A, upon receiving a music-content location query request whose destination is the music playback device 300A through the LAN connection terminal 302 and the LAN I/F 303, notifies the control unit 310 of the receipt of the request. The music playback device 300A has been in effect provided with the music content being played back in the manner described above, and the control unit 310 has knowledge of where the music content being played back is located.

Thus, upon receiving the location query request, the control unit 310 of the music playback device 300A generates a location query response about the music content being played back, and sends the location query response to the requesting mobile phone terminal 100 through the LAN I/F 303 and the LAN connection terminal 302 (step S48).

The location query response generated here may be information that can represent at least within which device, in which folder, and under which file name the music content being played back is stored.

The location query response is sent to the mobile phone terminal 100 via the LAN 500 and the wireless router 200, and is received by the mobile phone terminal 100. Also in the modification of the second embodiment, the music playback device 300A is playing back music content provided from the personal computer 400.

Thus, based on the location query response from the music playback device 300A, the mobile phone terminal 100 can recognize that the music content being played back is held in the personal computer 400 and can also recognize the folder name and the file name under which the music content being played back is stored.

The CPU 130 of the mobile phone terminal 100 generates, based on the location query response, a provision request for requesting the personal computer 400 to provide the music content being played back by the music playback device 300A, and sends the provision request to the personal computer 400 (step S49).

In step S49, the provision request generated by the CPU 130 of the mobile phone terminal 100 is sent to the personal computer 400 connected to the LAN 500 through the LAN module 118 and the LAN transmitting/receiving antenna 119.

Upon receiving a music-content provision request whose destination is the personal computer 400 through the LAN connection terminal 403 and the LAN I/F 404, the personal computer 400 notifies the control unit 410 of the receipt of the request. In accordance with the received provision request, the control unit 410 of the personal computer 400 reads the specified music content from the hard disk in the HDD 405, and sends the music content to the requesting mobile phone terminal 100 (step S50).

The music content read from the hard disk in the HDD 405 by the control unit 410 is converted into data of a transmission format. Then, the resulting data is delivered to the LAN 500 through the LAN I/F 404 and the LAN connection terminal 403, and is sent to the mobile phone terminal 100.

Thus, in a case where a plurality of music playback devices are connected to the same LAN and they are playing back music content at the same time, a device query response is obtained from each of them.

Then, based on the device query responses, a list of playback devices is displayed, and a desired content playback device is selected. Accordingly, the selected music playback device is queried for the location of the audio content, and the desired music content can be downloaded.

In this case, the user of the mobile phone terminal 100 can merely select a music playback device that is playing back music content to, without knowledge of the details of the music content being played back, download the music content being played back by the selected music playback device.

Additionally, in the modification of the second embodiment described with reference to FIG. 17, after a desired content playback device is selected, a detailed information provision request for music content is sent to the selected content playback device to obtain detailed information regarding the music content being played back.

However, the embodiment is not limited thereto. In the modification of the second embodiment, the procedure of steps S45 and S46 shown in FIG. 17 may be omitted.

Applications of Methods According to Embodiments

A content acquisition method according to an embodiment of the present invention may be applied to the mobile phone terminal 100 described above. Specifically, as described with reference to FIGS. 5, 8, 9, 11, 12, 15, 16, and 17, the music content obtaining procedure performed by the mobile phone terminal 100 may correspond to a content acquisition method according to an embodiment of the present invention.

In a first example, the content acquisition method may include (1) connecting to a network through communication means, (2) sending a location query request about content being played back to a content playback device, (3) receiving a location query response sent in accordance with the location query request, and recognizing the location of the content being played back on the basis of the location query response, (4) requesting the recognized location of the content (the content holding device) to provide the content, and (5) receiving the content sent in response to the request and using the content.

This corresponds to a part of the process according to the first embodiment, which has been described mainly with reference to FIGS. 5 and 8.

In a second example, the content acquisition method may include, prior to the processing steps of items (1) to (5) above, (A) sending a device query request which is an inquiry about a device that is playing back content, and (B) identifying a content playback device on the basis of a device query response sent in response to the device query request, and performing the processing step of item (1) above on the identified content playback device.

This corresponds to the process according to the first embodiment, which has been described mainly with reference to FIGS. 5, 8, and 15.

In a third example, the content acquisition method may include, in addition to the processing steps of items (A) and (B) above, when a device query response is sent from each of a plurality of devices, allowing a user of a mobile phone terminal to select which content playback device is the target.

This corresponds to a part of the process according to the second embodiment, which has been described mainly with reference to FIGS. 16 and 17.

In fourth and fifth examples, the content acquisition method may be configured such that a content provision form in which content is provided from a content holding device can be changed in various manners. This corresponds to the process according to the first modification of the first embodiment, which has been described mainly with reference to FIGS. 11 to 14 or any other figure.

Further, a content location notification method according to an embodiment of the present invention may be applied to the music playback device 300 described above. Specifically, as described with reference to FIGS. 5, 8, 9, 11, 12, 15, 16, and 17, a procedure for notifying the location of music content in response to an inquiry made by the music playback device 300 may correspond to a content location notification method according to an embodiment of the present invention.

In a first example, the content location notification method may include:

(1) connecting to a network through communication means, (2) playing back content on a given device, and (3) upon receiving a location query request about the content being played back, generating a location query response indicating the location of the content being played back on the basis of information held in the given device, and returning the location query response to the requester.

This corresponds to a part of the process according to the first embodiment, which has been described mainly with reference to FIGS. 5 and 9.

In a second example, the content location notification method may include prior to the processing steps of items (1) to (3) above:

(A) upon receiving a device query request which is an inquiry about a playback device, (B) if the given device is playing back content, in response to the device query request, returning a device query response indicating that the given device is a device that is playing back content.

This corresponds to the process according to the first embodiment, which has been described mainly with reference to FIGS. 5 and 9.

Applications of Programs According to Embodiments

A content acquisition program according to an embodiment of the present invention may be applied to the mobile phone terminal 100 described above. Specifically, as described with reference to FIGS. 5, 8, 9, 11, 12, 15, 16, and 17, the music content obtaining procedure performed by the mobile phone terminal 100 may be performed according to a content acquisition program according to an embodiment of the present invention.

In a first example, the content acquisition program may include the steps of:

(1) connecting to a network through communication means, (2) sending a location query request about content being played back to a content playback device, (3) receiving a location query response sent in accordance with the location query request, and recognizing the location of the content being played back on the basis of the location query response, (4) requesting the recognized location of the content (the content holding device) to provide the content, and (5) receiving the content sent in response to the request and using the content.

The CPU 130 of the mobile phone terminal 100 executes a part of the process according to the first embodiment, which has been described mainly with reference to FIGS. 5 and 8, to control each unit of the mobile phone terminal 100.

In a second example, the content acquisition program may cause the CPU 130 of the mobile phone terminal 100 to further execute the steps of:

prior to the processing steps of items (1) to (5) above, (A) sending a device query request which is an inquiry about a device that is playing back content; and (B) identifying a content playback device on the basis of a device query response sent in response to the device query request, and performing the processing step of item (1) above on the identified content playback device.

The CPU 130 of the mobile phone terminal 100 executes the process according to the first embodiment, which has been described mainly with reference to FIGS. 5, 8, and 15, to control each unit of the mobile phone terminal 100.

In a third example, the content acquisition program may include the step of, in addition to the processing steps of items (A) and (B) above, when a device query response is sent from each of a plurality of devices, allowing a user of a mobile phone terminal to select which content playback device is the target.

The CPU 130 of the mobile phone terminal 100 executes the process according to the second embodiment, which has been described mainly with reference to FIGS. 16 and 17, to control each unit of the mobile phone terminal 100.

Further, a content location notification program according to an embodiment of the present invention may be applied to the music playback device 300 described above. Specifically, as described with reference to FIGS. 5, 8, 9, 11, 12, 15, 16, and 17, a process performed until the location of music content has been notified in response to an inquiry made by the music playback device 300 may correspond a process performed according to an embodiment of the present invention.

In a first example, the content location notification program may include the steps of:

(1) connecting to a network through communication means, (2) playing back content on a given device, and (3) upon receiving a location query request about the content being played back, generating a location query response indicating the location of the content being played back on the basis of information held in the given device, and returning the location query response to the requester.

The control unit 310 of the music playback device 300 executes a part of the process according to the first embodiment, which has been described mainly with reference to FIGS. 5 and 9, to control each unit of the music playback device 300.

In a second example, the content location notification program may cause the control unit 310 of the music playback device 300 to execute the steps of:

prior to the processing steps of items (1) to (3) above, (A) receiving a device query request which is an inquiry about a playback device, (B) upon receiving a device query request, if the given device is playing back content, in response to the device query request, returning a device query response indicating that the given device is a device that is playing back content.

The control unit 310 of the music playback device 300 executes the process according to the first embodiment, which has been described mainly with reference to FIGS. 5, 9, and 15, to control each unit of the music playback device 300. Others In the first and second embodiments described above, the mobile phone terminal 100 has been described as being configured to download music content being played back. In this case, the downloaded music content can be stored in a recording medium incorporated in the mobile phone terminal 100, for example, the external memory 121, so that the music content can used at any time. The mobile phone terminal 100 can also be configured such that music content obtained by downloading can be played back via streaming and used.

In the first and second embodiments described above, content data to be downloaded has been described as music content. However, the embodiments are not limited thereto. The content data to be downloaded may be moving image data or AV data or the like which allows moving images and audio to be played back in synchronization with each other.

Further, devices to be connected to a LAN are not limited to those described above. An embodiment of the present invention may provide a network system to which various electronic devices having a LAN connection function, such as a television receiver having a LAN connection function, a hard disk recorder, a mobile communication terminal, and a game console, are connected.

Therefore, a mobile electronic device according to an embodiment of the present invention may not necessarily be limited to a mobile phone terminal. A mobile electronic device according to an embodiment of the present invention can be implemented by any of various types of electronic devices such as a mobile information terminal, a portable game console, a notebook-type personal computer, and an electronic organizer.

Furthermore, a content playback device according to an embodiment of the present invention may not necessarily be limited to a music playback device. Various content playback devices having a content playback function, such as a television receiver, a hard disk recorder, and a notebook-type personal computer, and a renderer device, can be used.

In the foregoing embodiments, devices connected to a LAN have been described as those with the function according to the DLNA guideline. However, the embodiments are not limited thereto. Any LAN-compatible device capable of being connected to LANs of a variety of standards and capable of sending and receiving information may be used.

The present application contains subject matter related to that disclosed in Japanese Priority Patent Application JP 2008-213725 filed in the Japan Patent Office on Aug. 22, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A mobile electronic device comprising:

communication means for performing communication by connecting to a network to which a plurality of content playback devices and one or more content holding devices are connected;

location query request sending means for generating a location query request about content being played back by one of the plurality of content playback devices connected to the network and sending the location query request to at least the one of the plurality of content playback devices on the network;

location query response receiving means for receiving a location query response about the content being played back by the one of the plurality of content playback devices from the one of the plurality of content playback devices through the communication means, the location query response being sent via the network in accordance with the location query request and including address information corresponding to a content holding device that holds the content being played back by the one of the plurality of content playback devices;

provision form receiving means for receiving an instruction input of a content provision form in which content is provided;

provision request sending means for generating a provision request for requesting that content be provided in the content provision form received in the provision form receiving means and sending the provision request through the communication means to the content holding device that holds the content being played back by the one of the plurality of content playback devices in accordance with the address information included in the received location query response; and content receiving means for receiving through the communication means content that is sent from the content holding device via the network in accordance with the provision request.

2. The mobile electronic device according to claim 1, further comprising:

device query request sending means for generating a device query request about the one of the plurality of content playback devices that is playing back content and sending the device query request to the plurality of content playback devices on the network through the communication means; and device query response receiving means for receiving through the communication means a device query response indicating the one of the plurality of content playback devices that is playing back content, the device query response being sent via the network in accordance with the device query request, wherein the location query request sending means sends the location query request to the one of the plurality of content playback devices that is playing back content, the one of the plurality of content playback devices being specified by the device query response received in the device query response receiving means.

3. The mobile electronic device according to claim 1, further comprising:

device query request sending means for generating a device query request about the one of the plurality of content playback devices that is playing back content and sending the device query request to the plurality of content playback devices on the network through the communication means;

device query response receiving means for receiving through the communication means a device query response indicating the one of the plurality of content playback devices that is performing playback, the device query response being sent via the network in accordance with the device query request;

display control means for, when the device query response is received from each of the plurality of content playback devices through the device query response receiving means, based on the device query responses, displaying a playback device selection screen for selecting a content playback device on display means; and selection input receiving means for receiving a selection input of a desired content playback device on the playback device selection screen, wherein the location query request sending means sends the location query request to a content playback device specified by the device query response from the content playback device selected through the selection input receiving means.

4. The mobile electronic device according to claim 1, wherein the content provision form includes at least one of a form for providing only an item of content being played back, a form for providing a plurality of items of content in a predetermined group including an item of content being played back, a form for providing an item of content specified in accordance with an author or performer of an item of content being played back, and a form for providing an item of content within a genre of an item of content being played back.

5. A content acquisition method comprising the steps of:
connecting through communication means to a network to which a plurality of content playback devices and one or more content holding devices are connected;

generating a location query request about content being played back by one of the plurality of content playback devices connected to the network and sending the location query request to at least the one of the plurality of content playback devices on the network;

receiving a location query response about the content being played back by the one of the plurality of content playback devices from the one of the plurality of content playback devices through the communication means, the location query response being sent via the network in accordance with the location query request and including address information corresponding to a content holding device that holds the content being played back by the one of the plurality of content playback devices;

receiving an instruction input of a content provision form in which content is provided;

generating a provision request for requesting that content be provided in the received content provision form and sending the provision request through the communication means to the content holding device that holds the content being played back by the one of the plurality of content playback devices in accordance with the address information included in the received location query response; and receiving through the communication means content that is sent from the content holding device via the network in accordance with the provision request.

6. The content acquisition method according to claim 5, further comprising the steps of:

generating a device query request about the one of the plurality of content playback devices that is playing back content and sending the device query request to the plurality of content playback devices on the network through the communication means; and receiving a device query response through the communication means, the device query response indicating the one of the plurality of content playback devices that is performing playback, the device query response being sent via the network in accordance with the device query request, wherein in the step of generating a location query request, the location query request is sent to the one of the plurality of content playback devices that is playing back content, the one of the plurality of content playback devices being specified by the device query response received in the step of receiving a device query response.

7. The content acquisition method according to claim 5, further comprising the steps of:

generating a device query request about the one of the plurality of content playback devices that is playing back content and sending the device query request to the plurality of content playback devices on the network through the communication means;

receiving a device query response through the communication means, the device query response indicating the one of the plurality of content playback devices that is performing playback, the device query response being sent via the network in accordance with the device query request;

when the device query response is received from each of the plurality of content playback devices in the step of receiving a device query response, based on the device query responses, displaying a playback device selection screen for selecting a content playback device on display means; and receiving a selection input of a desired content playback device on the playback device selection screen, wherein in the step of generating a location query request, the location query request is sent to a content playback device specified by the device query response from the content playback device selected in the step of receiving a selection input.

8. The content acquisition method according to claim 5, wherein the content provision form includes at least one of a form for providing only an item of content being played back, a form for providing a plurality of items of content in a predetermined group including an item of content being played back, a form for providing an item of content specified in accordance with an author or performer of an item of content being played back, and a form for providing an item of content within a genre of an item of content being played back.

9. A non-transitory computer-readable medium including computer-readable content acquisition program for causing a computer provided in a mobile electronic device to execute the steps of:

connecting through communication means to a network to which a plurality of content playback devices and one or more content holding devices are connected;

generating a location query request about content being played back by one of the plurality of content playback devices connected to the network and sending the location query request to at least the one of the plurality of content playback devices on the network;

receiving a location query response about the content being played back by the one of the plurality of content playback devices from the one of the plurality of content playback devices through the communication means, the location query response being sent via the network in accordance with the location query request and including address information corresponding to a content holding device that holds the content being played back by the one of the plurality of content playback devices;

receiving an instruction input of a content provision form in which content is provided;

generating a provision request for requesting that content be provided in the received content provision form and sending the provision request through the communication means to the content holding device that holds the content being played back by the one of the plurality of content playback devices in accordance with the address information included in the received location query response; and receiving through the communication means content that is sent from the content holding device via the network in accordance with the provision request.

10. A content use system comprising:

a mobile electronic device including communication means for performing communication by connecting to a network to which a content playback device and a content holding device are connected, location query request sending means for generating a location query request about content being played back by the content playback device connected to the network and sending the location query request to the content playback device on the network, location query response receiving means for receiving a location query response about the content being played back by the content playback device from the content playback device through the communication means, the location query response being sent via the network in accordance with the location query request and including address information corresponding to the content holding device that holds the content being played back by the content playback device, provision form receiving means for receiving an instruction input of a content provision form in which content is provided;

provision request sending means for generating a provision request for requesting that content be provided in the content provision form received in the provision form receiving means and sending the provision request through the communication means to the content holding device that holds the content being played back by the content playback device in accordance with the address information included in the received location query response, and content receiving means for receiving through the communication means content that is sent from the content holding device via the network in accordance with the provision request;

the content playback device including communication means for performing communication by connecting to the network to which the mobile electronic device and the content holding device are connected, playback means for playing back content sent to the content playback device from the content holding device via the network and that is received through the communication means, location query request receiving means for receiving the location query request about content being played back by the content playback device through the communication means, the location query request being sent to the content playback device from the mobile electronic device via the network, and location query response sending means for, when content is being played back using the playback means and when a location query request to the content playback device is received through the location query request receiving means, generating the location query response including the address information corresponding to the content holding device that sends the content to the content playback device and sending the location query response through the communication means to the mobile electronic device; and the content holding device including communication means for performing communication by connecting to the network to which the mobile electronic device and the content playback device are connected, provision request receiving means for receiving through the communication means from the mobile electronic device the content provision request for providing content, the content provision request being sent to the content holding device from the mobile electronic device via the network, and content sending means for sending requested content to the mobile electronic device through the communication means in response to the received content provision request.

11. A mobile electronic device comprising:

a communication unit configured to perform communication by connecting to a network to which a plurality of content playback devices and one or more content holding devices are connected;

a location query request sending unit configured to generate a location query request about content being played back by one of the plurality of content playback devices connected to the network and send the location query request to at least the one of the plurality of content playback devices on the network;

a location query response receiving unit configured to receive a location query response about the content being played back by the one of the plurality of content playback devices from the one of the plurality of content playback devices through the communication unit, the location query response being sent via the network in accordance with the location query request and including address information corresponding to a content holding device that holds the content being played back by the one of the plurality of content playback devices;

a user interface configured to receive an instruction input of a content provision form in which content is provided;

a provision request sending unit configured to generate a provision request for requesting that content be provided in the content provision form received at the user interface and send the provision request through the communication unit to the content holding device that holds the content being played back by the one of the plurality of content playback devices in accordance with the address information included in the received location query response; and a content receiving unit configured to receive through the communication unit content that is sent from the content holding device via the network in accordance with the provision request.

12. A content use system comprising:
a mobile electronic device including
- a communication unit configured to perform communication by connecting to a network to which a content playback devices and a content holding device are connected,
- a location query request sending unit configured to generate a location query request about content being played back by the content playback device connected to the network and send the location query request to the content playback device on the network,
- a location query response receiving unit configured to receive a location query response about the content being played back by the content playback device from the content playback device through the communication unit, the location query response being sent via the network in accordance with the location query request and including address information corresponding to the content holding device that holds the content being played back by the content playback device,
- a user interface configured to receive an instruction input of a content provision form in which content is provided:
- a provision request sending unit configured to generate a provision request for requesting that content be provided in the content provision form received at the user interface and send the provision request through the communication unit to the content holding device that holds the content being played back by the content playback device in accordance with the address information included in the received location query response, and
- a content receiving unit configured to receive through the communication unit content that is sent from the holding device via the network in accordance with the provision request;

the content playback device including
- a communication unit configured to perform communication by connecting to the network to which the mobile electronic device and the content holding device are connected,
- a playback unit configured to play back content that is sent to the content playback device from the content holding device via the network and that is received through the communication unit,
- a location query request receiving unit configured to receive the location query request about content being played back by the content playback device through the communication unit, the location query request being sent to the content playback device from the mobile electronic device via the network, and
- a location query response sending unit configured to, when content is being played back using the playback unit and when a location query request to the content playback device is received through the location query request receiving unit, generate the location query response including the address information corresponding to the content holding device that sends the content to the content playback device and send the location query response through the communication unit to the mobile electronic device; and the content holding device including
- a communication unit configured to perform communication by connecting to the network to which the mobile electronic device and the content playback device are connected,
- a provision request receiving unit configured to receive through the communication unit from the mobile electronic device the content provision request for providing content, the content provision request being sent to the
- content holding device from the mobile electronic device via the network, and a content sending unit configured to send requested content to the mobile electronic device through the communication unit in response to the received content provision request.

* * * * *